United States Patent
Arlagadda Narasimharaju et al.

(10) Patent No.: US 12,190,173 B2
(45) Date of Patent: Jan. 7, 2025

(54) METHODS AND APPARATUS FOR POWER SHARING BETWEEN DISCRETE PROCESSORS

(71) Applicant: Intel Corporation, Santa Clara, CA (US)

(72) Inventors: Niharika Arlagadda Narasimharaju, Hillsboro, OR (US); Sudheer Nair, Portland, OR (US); James Hermerding, II, Vancouver, WA (US); Merwin Brown, El Dorado Hills, CA (US); Deepak Ganapathy, Folsom, CA (US); Fabian Garita Gonzalez, San Rafael (CR)

(73) Assignee: Intel Corporation, Santa Clara, CA (US)

( * ) Notice: Subject to any disclaimer, the term of this patent is extended or adjusted under 35 U.S.C. 154(b) by 759 days.

(21) Appl. No.: 17/213,747

(22) Filed: Mar. 26, 2021

(65) Prior Publication Data
US 2021/0216377 A1    Jul. 15, 2021

(51) Int. Cl.
G06F 9/50 (2006.01)
G06F 1/28 (2006.01)

(52) U.S. Cl.
CPC .............. G06F 9/5094 (2013.01); G06F 1/28 (2013.01)

(58) Field of Classification Search
None
See application file for complete search history.

(56) References Cited

U.S. PATENT DOCUMENTS

| | | | | |
|---|---|---|---|---|
| 6,968,441 B1* | 11/2005 | Schnee | ................. | G06F 9/5077 711/173 |
| 8,930,676 B2* | 1/2015 | Henry | .................. | G06F 9/4403 712/32 |
| 10,606,338 B2 | 3/2020 | Nair et al. | | |
| 11,039,404 B2* | 6/2021 | Muthaiyan | .......... | H04W 52/343 |
| 2004/0117680 A1* | 6/2004 | Naffziger | ................ | G06F 1/324 713/322 |
| 2008/0005592 A1* | 1/2008 | Allarey | .................... | G06F 1/206 713/300 |
| 2008/0072079 A1* | 3/2008 | Bieswanger | .......... | G06F 1/3293 713/300 |
| 2008/0082844 A1* | 4/2008 | Ghiasi | .................... | G06F 1/3203 713/323 |
| 2011/0138388 A1* | 6/2011 | Wells | .................... | G06F 9/5027 718/100 |
| 2012/0166837 A1* | 6/2012 | Henry | .................. | G06F 1/3203 713/321 |
| 2012/0166845 A1* | 6/2012 | Henry | .................. | G06F 9/5094 713/323 |
| 2013/0145180 A1* | 6/2013 | Branover | .................. | G06F 1/32 713/300 |

(Continued)

Primary Examiner — Adam Lee
(74) Attorney, Agent, or Firm — Hanley, Flight & Zimmerman, LLC

(57) ABSTRACT

Methods, apparatus, systems and articles of manufacture for power sharing between discrete processors are disclosed. An example apparatus includes a thermal monitor to monitor temperatures of first and second discrete processors and a balance controller to, in response to a first temperature of the first processor satisfying a temperature threshold, adjust first and second power budgets allocated to the respective first and second processors.

25 Claims, 14 Drawing Sheets

(56) References Cited

U.S. PATENT DOCUMENTS

| | | | |
|---|---|---|---|
| 2013/0246820 A1* | 9/2013 | Branover | G06F 1/206 713/320 |
| 2013/0305074 A1* | 11/2013 | Ellis | G11C 29/028 713/324 |
| 2014/0298349 A1* | 10/2014 | Jackson | G06F 1/3206 718/104 |
| 2015/0026495 A1* | 1/2015 | Jain | G06F 1/32 713/323 |
| 2015/0058650 A1* | 2/2015 | Varma | G06F 1/3287 713/320 |
| 2015/0171066 A1* | 6/2015 | Yamamichi | H01L 25/18 257/411 |
| 2015/0340898 A1* | 11/2015 | Schwartz | G06F 1/266 320/103 |
| 2016/0011914 A1* | 1/2016 | Bohn | G06F 9/5094 713/300 |
| 2016/0132383 A1* | 5/2016 | Decesaris | G06F 11/0706 714/37 |
| 2016/0239068 A1* | 8/2016 | Varma | G06F 1/3206 |
| 2017/0063088 A1* | 3/2017 | Wang | G05B 15/02 |
| 2017/0068261 A1* | 3/2017 | Hsu | G06F 1/206 |
| 2019/0204900 A1 | 7/2019 | Nair et al. | |
| 2019/0384367 A1* | 12/2019 | Jain | G06F 1/3296 |
| 2020/0064894 A1* | 2/2020 | Li | G06F 1/26 |
| 2020/0073456 A1* | 3/2020 | Nguyen | G06F 1/3296 |
| 2020/0319700 A1* | 10/2020 | Wu | G06F 1/3243 |
| 2021/0064426 A1* | 3/2021 | Gupta | G06F 1/10 |
| 2021/0157383 A1* | 5/2021 | Hsu | G06F 1/3287 |
| 2022/0019561 A1* | 1/2022 | Jose | G06F 1/3206 |
| 2022/0147127 A1* | 5/2022 | Chih | G06F 1/206 |

* cited by examiner

METHODS AND APPARATUS FOR POWER SHARING BETWEEN DISCRETE PROCESSORS

FIELD OF THE DISCLOSURE

This disclosure relates generally to power sharing between components and, more particularly, to methods and apparatus for power sharing between discrete processors.

BACKGROUND

Computing devices designed with discrete graphics engines have presented unique challenges regarding balancing and managing power limits at the platform level. Existing solutions are often limited to balancing the sustained thermally relevant power.

Figure 1:
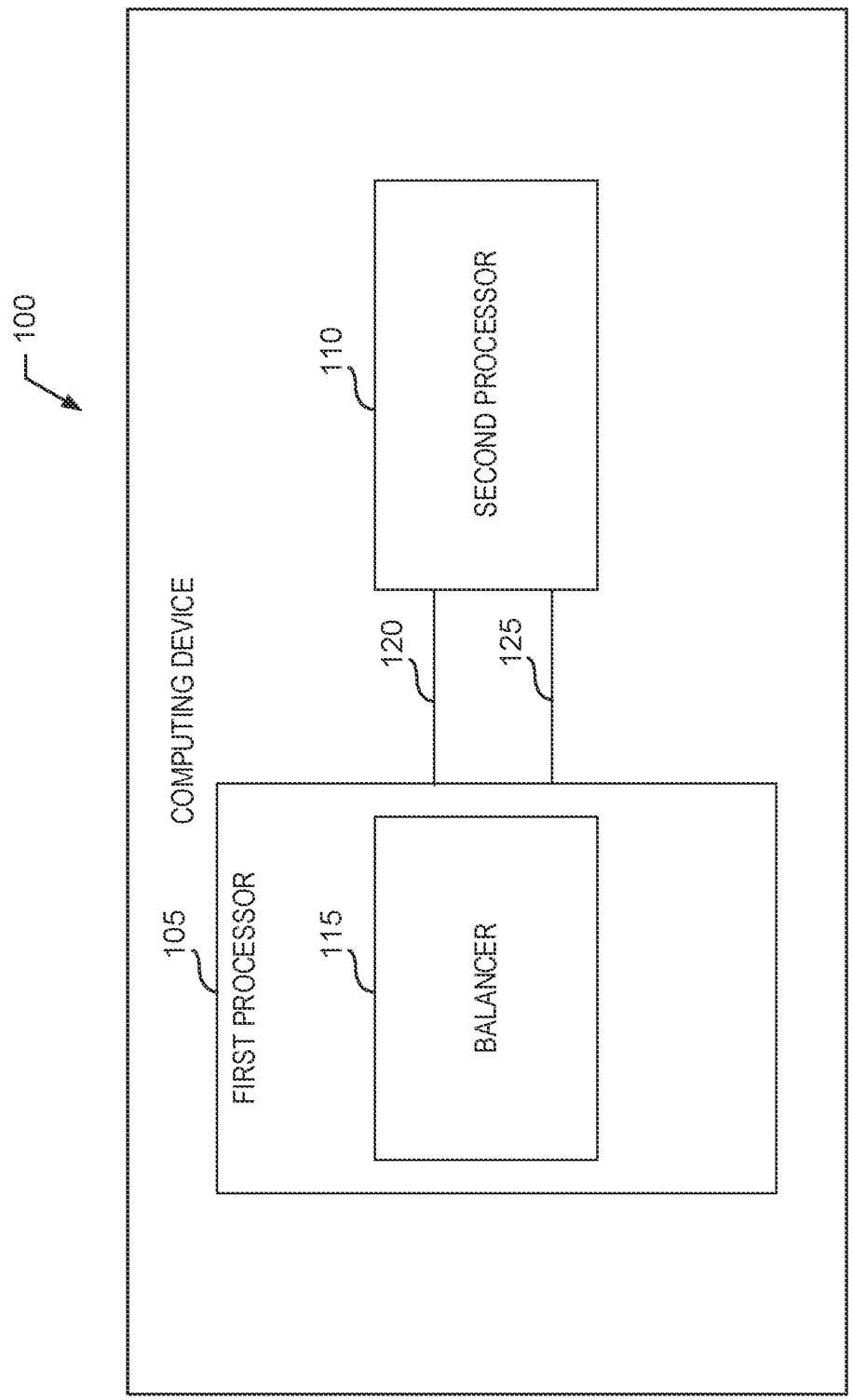
FIG. 1 is a block diagram of an example computing device constructed in accordance with teachings of this disclosure, where the computing device includes multiple discrete processors.

The figures are not necessarily to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As used herein, two processors are "discrete" if the processors are implemented in two separate semiconductor dies. Thus, discrete processors are contrasted with integrated processors that are implemented in a single die (e.g., as separate cores). Notably, two or more processors may be included in a single integrated circuit package and still be considered discrete, as the term is used herein, so long as the processors are implemented in distinct dies within the package. Computing devices designed with multiple discrete processors (e.g., a central processing unit (CPU) and a discrete graphics processing unit (GPU)) are limited in the ability to allocate or balance power budgets between the discrete processors in a manner that provides improved (e.g., optimal) performance. Existing solutions set static turbo power limits for discrete processors, which does not allow for the computing device to react to high power demand. Additionally, these static limits cause false balancer transitions which reduce the performance of the computing device unnecessarily. Furthermore, managing peak power of discrete processors often requires tradeoffs in setting turbo power limits for each discrete processor to address overall power supply limitations (particularly relevant for battery powered devices), resulting in lost turbo performance. The challenge is not simply one of setting suitable power limits for each processor based on a preset platform power budget, but also making sure the power budget is balanced between the processors in a manner that considers the actual operation of the processors at any given time. For instance, a particular power limit setting for one processor may be suitable when a second discrete processor is also active, but that same power limit may be unnecessarily limiting (thereby negatively impacting performance) when the second processor is inactive or in a low power operating mode.

For purposes of explanation, examples disclosed herein are described with reference to a discrete graphics system in which a graphics processor is implemented in a discrete die from a main processor (which may or may not have an integrated graphics core in addition to one or more compute cores). However, teachings of this disclosure may be applied to any type of discrete processors. More specifically, what distinguishes discrete graphics power balancing concerns from an integrated graphics system (e.g., a central processor die that includes separate compute and graphics cores) is that discrete graphics systems must balance power at the platform level rather than the central processor level where hardware balancing can more easily manage bias between compute power and graphics power within the total package power limits. Existing platform power solutions can address overall platform limits, but they are not a substitute for balancing power between the CPU and a discrete graphics processor in a manner that improves (e.g., maximizes) performance.

As evidence of challenges to create a balanced discrete graphics system, the power delivery and instantaneous power limits of the CPU and/or the graphics unit are not always designed to work in conjunction with existing power management solutions. As a result, discrete graphics systems often implement poorly balanced power management schemes. To address the poor CPU and discrete graphics power balancing schemes, teachings disclosed herein provide improvements to power balancing by allowing power re-balancing relative to thermal, utilization, and/or power metrics associated with the discrete CPU and graphics processor. The power re-balancing relative to the thermal, utilization, and/or power metrics allow for three-dimensional rebalancing of power during sustained power events, turbo power events, as well as peak power events.

As used herein, sustained power events refer to power events occurring during the standard long-term expected steady-state operating mode of a processor. Such sustained power events are subject to a sustained power limit that corresponds to the long-term operation of the processor. In some examples, the sustained power limit corresponds to the thermal design power (TDP) of the processor. In some examples, the long-term, steady state nature of the sustained power mode enables power balancing during sustained power events to be effectively performed based on data collected at polling rates on the order of minutes.

As used herein, turbo power events refer to high-power events occurring during a short-term turbo operating mode. As used herein, a high-power event is a power event associated with power that exceeds the sustained power limit associated with the long-term, steady-state operating mode. Turbo power events are subject to a turbo power limit that is higher than the sustained power limit. Unlike sustained power events, which can be long-term based on the steady-state nature of the corresponding steady-state operating mode, turbo power events are limited to relatively short durations. In some examples, the short-term nature of the turbo power events is such that data for power balancing during such events needs to be collected at polling rates on the order of milliseconds, and such events may continue for several seconds. Accounting for turbo power events prevent battery wear and increase the longevity of a system's battery.

As used herein, peak power events also refer to high power events (e.g., involve power exceeding the sustained power limit). However, as used herein, peak power events are power events that involve power that even exceeds the turbo power limit. Thus, peak power events are subject to peak power limit that is higher than the turbo power limit. In some examples, the peak power limit is highest possible power at which a processor is allowed to operate. Typically, peak power events are very short (on the order of milliseconds) spikes in processor power such that polling rates need to be at similar rates or even faster to reliably enable power balancing in response to such events. Accounting for peak power events ensure that input power supplies will maintain proper system voltage necessary for proper performance.

While existing power management solutions include some dynamic balancing of power between components during sustained (e.g., steady state) power events, existing solutions for turbo and peak power (or high power) events achieve a balance of power between components using fixed or static power limits. With static power limits (or power budgets), the capability of existing solutions to react to demanding stimulus high power in a dynamic manner is lost. Higher performance can be gained with high power share as included in this disclosure.

Examples disclosed herein use utilization, power, and thermal metrics to balance power between discrete processors in a dynamic manner to improve (e.g., maximize) performance. More particularly, examples disclosed herein monitor the temperature of discrete processors to enable power allocation between the discrete processors according to thermal limitations or thermal headroom. Furthermore, examples disclosed herein expand the power balancing algorithm to improve high power capabilities for the discrete processors, improving balancing for both instantaneous power limits (e.g., power limits at any given point in time) and input power delivery limits. To prevent false balancing transitions based on momentary events (e.g., abrupt changes in power demands that reverse as quickly as they arise), examples disclosed herein detect an uninterrupted change in power demands indicative of a suitable time for power rebalancing while filtering out temporary impulses in thermal, utilization, and/or power metrics of the discrete processors for which power rebalancing is unnecessary because of the temporary nature of the change in thermal, utilization, and/or power metrics. Further, in order to increase responsiveness without incurring significant computational overhead and associated increases in power consumption, some examples disclosed herein use an additional communication channel to communicate between discrete processors and/or dedicated firmware and/or hardware to poll the discrete processors for the utilization, power, and/or thermal metrics used to dynamically balance power between the processors.

FIG. 1 is a block diagram of an example computing device 100 constructed in accordance with teachings of this disclosure. The example computing device 100 (may also be referred to as computing system 100, system 100, etc.) of FIG. 1 may be any type of computing device (e.g., a desktop computer, a laptop computer, a tablet, a smartphone, etc.). As shown in the illustrated example, the computing device 100 includes an example first processor 105, an example second processor 110, and an example balancer 115. In this example, the first processor 105 is discrete from the second processor 110. That is, the first and second processors 105, 110 are implemented in a separate semiconductor dies. However, in some examples, the first and second processors 105, 110 may be included in a single integrated circuit (IC) package.

For purposes of discussion, in this example, the first processor 105 represents a Central Processing Unit (CPU). However, in other examples, the first processor may correspond to any suitable type of processor (e.g., a Graphics Processing Unit (GPU), a Digital Signal Processor (DSP), a hardware accelerator, etc.). In the illustrated example of FIG. 1, the first processor 105 uses an example bus or interconnect 120 to communicate with the example the second processor 110. In examples where both processors 105, 110 are implemented in a single IC package, the bus 120 may be implemented in a bridge, an interposer, and/or any other suitable interconnect between the discrete processors 105, 110.

For purposes of discussion, in this example, the second processor 110 represents a discrete GPU. However, in other examples, the second processor may correspond to any suitable type of processor (e.g., a CPU, a DSP, a hardware accelerator, etc.).

The example balancer 115 uses thermal, power, and utilization metrics associated with the processors 105, 110 to balance power between the processors 105, 110 in a manner that improves power efficiency and computational performance. In the illustrated example of FIG. 1, the balancer 115 is implemented by the first processor 105. However, the balancer 115 may alternatively be implemented by the second processor 110. In other examples, the balancer 115 may be implemented external to both the first processor 105 and the second processor 110 (e.g., in a separate processor and/or in dedicated firmware and/or hardware). Further still, in some examples, different functions of the balancer 115 may be distributed across different locations between the first processor, the second processor, and/or one or more other components external to both processors 105, 110.

In some examples, a sideband communication channel 125 that is independent of the main communication channel 120 may be provided between the processors 105, 110. The sideband communication channel 125 may serve as a dedicated channel to provide faster telemetry of metrics associated with the temperature, utilization, and/or power of the processors relevant to calculations performed by the balancer 115 to reallocate or balance a power budget between the separate processors 105, 110. More particularly, in some examples, the sideband communication channel 125 serves to provide faster telemetry of metrics from the second processor 110 to the first processor 105 where the balancer 115 is implemented. In examples, where the balancer 115 is implemented in a component external to both processors 105, 110, the sideband communication channel 125 may provide faster telemetry of metrics from each of the processors 105, 110 to the external component.

Figure 2:
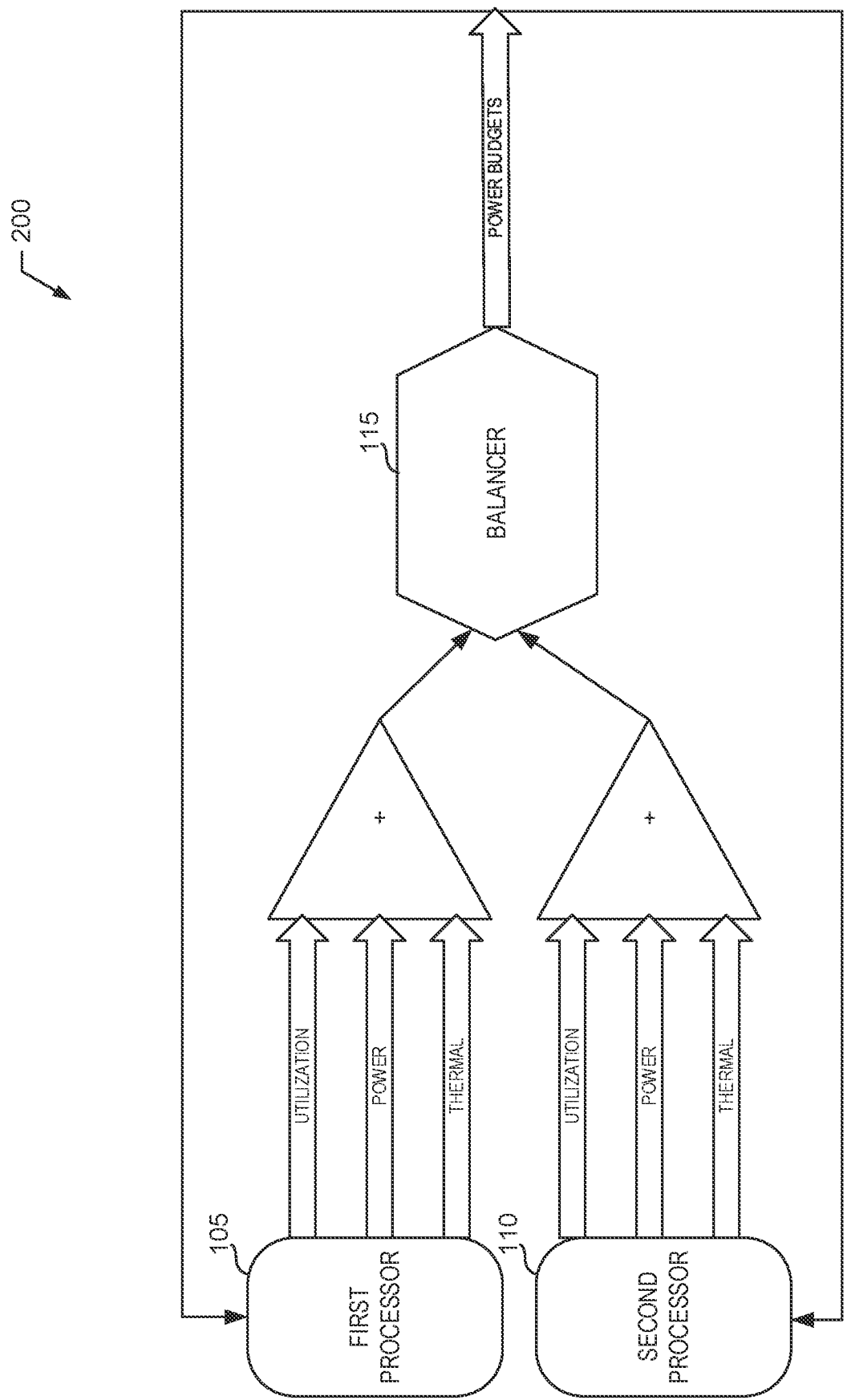
FIG. 2 is an illustration of the interaction between the example discrete processors within the example computing device of FIG. 1.

FIG. 2 is a block diagram further illustrating the relationship between the example first processor 105, the example the second processor 110, and the example balancer 115. In this example, the first processor 105 and the second processor 110 provide utilization metrics (activity percentages, active device time, average usage, etc.), power metrics (input power, power consumption, power limits, etc.), and thermal metrics (thermal headroom, skin temperature, junction temperature, etc.) to the balancer 115. In some examples, the processors 105, 110 may provide values corresponding to these metrics automatically on a periodic basis and/or whenever the values change. In some examples, the processors 105, 110 may provide values corresponding to these metrics in response to a request or poll from the balancer 115 requesting such information. In some such examples, the balancer 115 may poll the processors 105, 110 on a periodic basis and/or according to any other suitable schedule and/or otherwise as needed. In accordance with teachings of this disclosure, the balancer 115 performs calculations to determine efficient power budgets based on the utilization, power, and/or thermal metrics of the first processor and the second processor.

Figure 3:
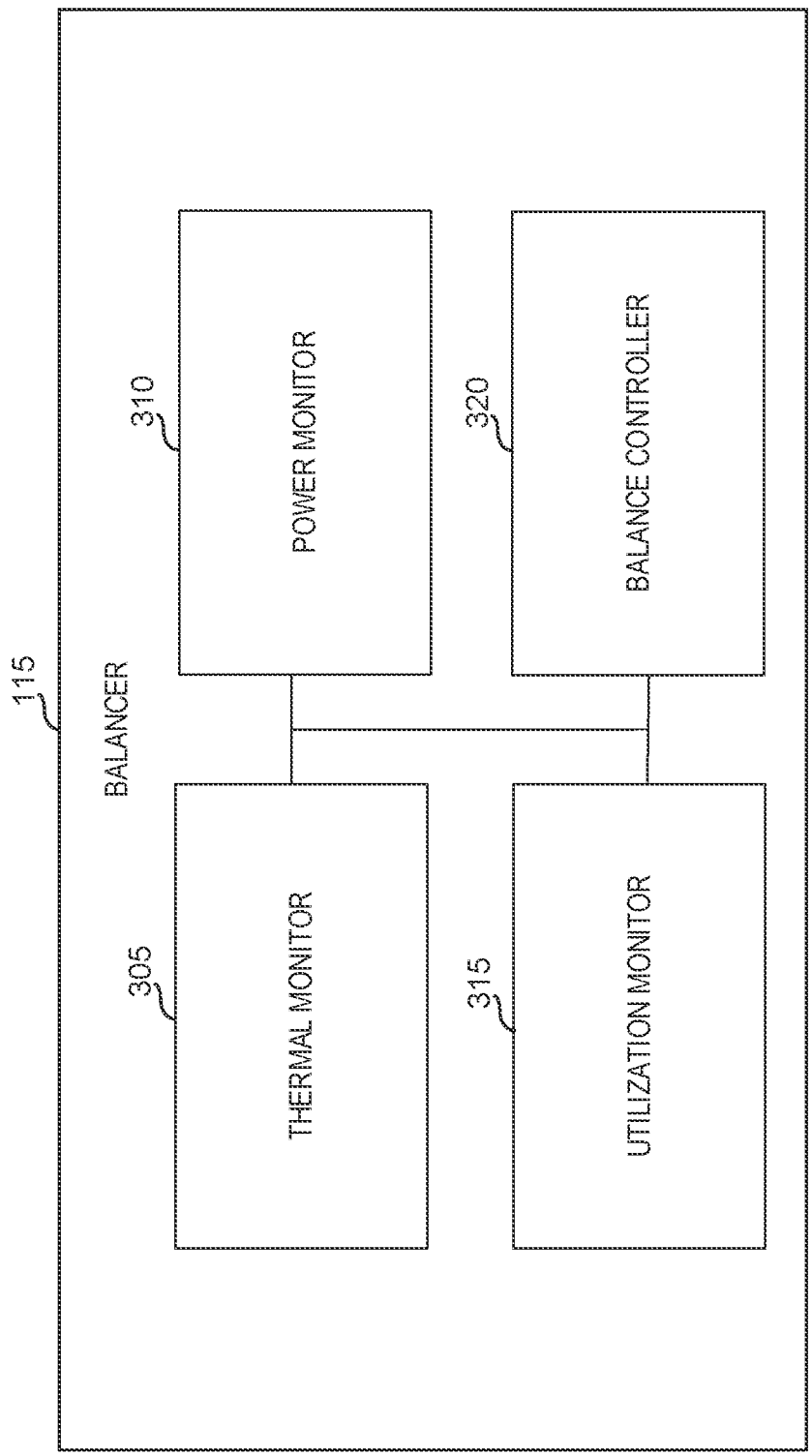
FIG. 3. is a block diagram of the example balancer within the example computing device of FIG. 1 in accordance with teachings of this disclosure.

FIG. 3 is a block diagram of the example balancer 115 of FIGS. 1 and/or 2. In the illustrated example, the balancer 115 includes an example thermal monitor 305, an example power monitor 310, an example utilization monitor 315, and an example balance controller 320.

In the illustrated example of FIG. 3, the thermal monitor 305 monitors a temperature of the first processor 105 and the second processor 110. More particularly, each of the processors 105, 110 may be associated with one or more temperature sensors that provide temperature data indicative of the temperature of the respective processor 105, 110. In some examples, the temperature of one of the processors 105, 110 is based on multiple different temperature measurements associated with different temperature sensors of the respective processors 105, 110. For instance, each processor may include one or more junction or internal temperature sensors to provide a junction temperature of each processor. Additionally or alternatively, each processor may include one or more skin or surface temperature sensors to provide a skin temperature of the computing device. In some examples, the processors 105, 110 may be associated with the same skin temperature. In some examples, the thermal monitor 305 may reduce multiple different temperature readings to a single temperature or a limited set of temperatures for each processor. For example, the thermal monitor 305 may calculate an average of multiple different temperature measurements. In some examples, the thermal monitor 305 may select a highest temperature measurement as the representative temperature for a processor. In some examples, the thermal monitor 305 may consider only the junction temperature of the processor or only the skin temperature of the computing device. The temperature(s) of the first processor and/or the temperature of the second processor monitored by the thermal monitor 305 can be stored in any memory, storage device and/or storage disc for storing data such as, for example, flash memory, magnetic media, optical media, solid state memory, hard drive(s), thumb drive(s), etc. Furthermore, the data obtained by the thermal monitor 305 may be in any data format such as, for example, binary data, comma delimited data, tab delimited data, structured query language (SQL) structures, etc.

In the illustrated example of FIG. 3, the power monitor 310 monitors the power consumption of the first processor 105 and the second processor 110. More particularly, each of the processors 105, 110 may be associated with one or more power meters that provide power data indicative of the power consumption of the respective processor 105, 110. In some examples, the power consumption of one of the processors 105, 110 is based on multiple power meter measurements associated with the different power meters of the respective processors 105, 110 (e.g., corresponding to different cores in the processors). The power consumption of the first processor and the second processor can be stored in any memory, storage device and/or storage disc for storing data such as, for example, flash memory, magnetic media, optical media, solid state memory, hard drive(s), thumb drive(s), etc. Furthermore, the data used in calculations by the balance controller 320 may be in any data format such as, for example, binary data, comma delimited data, tab delimited data, structured query language (SQL) structures, etc.

In the illustrated example of FIG. 3, the utilization monitor 315 monitors the activity of the first processor 105 and the second processor 110. More particularly, in some examples, the utilization monitor 315 determines an amount of time each processor is active over a given period. As used herein, a processor is active whenever the activity level of the processor is higher than an activity threshold (e.g., 10% activity, 20% activity, etc.). For example, executing a workload may cause the activity level of a processor to rise above the activity threshold, and upon the activity level of the processor reaching above the activity threshold, the processor is said to be active. In some examples, the utilization monitor 315 tracks the activity of each of the processors 105, 110 by analyzing workloads scheduled in a workload scheduler of each processor. That is, in some examples, the utilization monitor 315 is in communication with a workload scheduler in each processor 105, 110 and/or otherwise has access to schedule information generated by such scheduled. The utilization monitor 315 analyzes such schedule information to determine the number and/or frequency that workload submissions are provided to the respective schedulers for execution relative to times when there are workload submissions to determine the active time for the processors. In some examples, the active time may be expressed as a proportion or percentage of time relative to the given period of interest (e.g., a sampling interval). In some examples the active time may be expressed as an absolute amount of time during the given period of interest. In some examples, the active time is averaged over the given period of interest. The utilization metrics monitored by the utilization monitor 315 can be stored in any memory, storage device and/or storage disc for storing data such as, for example, flash memory, magnetic media, optical media, solid state memory, hard drive(s), thumb drive(s), etc. Furthermore, the data obtained by the utilization monitor 315 may be in any data format such as, for example, binary data, comma delimited data, tab delimited data, structured query language (SQL) structures, etc.

The balance controller 320 calculates and allocates the power budgets of the first processor and the second processor based on the temperature of the first processor and the second processor obtained by the thermal monitor 305, the power metrics of the first processor and the second processor monitored by the power monitor 310, and the utilization metrics monitored by the utilization monitor 315. The balance controller 320 may reallocate the power budget between the first processor 105 and the second processor 110 when either the first processor 105 or the second processor 110 is using less power than what the processor has been allocated (e.g., there is unused power budget). A portion of the power budget allocated to the first processor 105 and/or the second processor 110 may go unused due to the processor(s) being thermally limited, inactive, or actively consuming power below its budget. In order, the balance controller 320 reallocates such unused power budget between the first processor 105 and/or the second processor 110 to improve power and/or performance efficiencies.

More particularly, while some existing approaches balance and/or adjust power budgets between discrete components based on changes to the power and/or utilization of ones of the components, the example balance controller 320 uses thermal metrics as an additional input to obtain more insight into the amount of power used (or not used) by each processor 105, 110 for improved efficiency. Balancing power budgets based on thermal metrics can improve power efficiencies because the amount of power a processor consumes at any given time may be limited by its temperature such that allocating more power to the processor is an unnecessary waste of power that could be more efficiently used by a separate processor. More particularly, in some examples, a processor may self-throttle due to temperature limits, thereby reducing the amount of power the processor needs to operate so as to lower the processor temperature (or at least prevent the temperature from increasing further). Allocating additional power to a processor that is throttling serves no purpose, but merely uses up some of the overall power budget for the system that could otherwise be allocated to a discrete processor for greater efficiency and/or improved performance.

In some examples, the balance controller 320 determines whether the temperature(s) for the first processor 105 and/or the second processor 110 satisfy (e.g., is above) a temperature threshold. In this example, the temperature threshold can be a thermal limit (e.g., a maximum operating temperature) for the processor. In some examples, the thermal limit is a limit for the surface or skin temperature of the computing device. In some examples, the thermal limit is a limit for the internal or junction temperature of the processor. In some examples, the same temperature threshold may be used for both processors 105, 110. In some examples, a different temperature threshold may be defined for each processor 105, 110. When either the first processor 105 or the second processor 110 has a temperature at or above the corresponding temperature threshold, that processor is said to be thermally limited. When a processor is thermally limited (e.g., its temperature satisfies the temperature threshold), the processor may respond by adjusting its operation (e.g., begin throttling) to reduce power consumption to reduce the likelihood of a further increase in temperature (and/or to lower the temperature of the processor). Accordingly, in some examples, if the balance controller 320 determines that the temperature of either processor 105, 110 satisfies the temperature threshold (e.g., is thermally limited), the example balance controller 320 adjusts the power budget of the first processor and the second processor in anticipation of the reduced power consumption of the thermally limited processor. More particularly, in some examples, the balance controller 320 decreases the power budget allocated to the thermally limited processor (as no longer needed) and increases the power budget allocated to the non-thermally limited processor (based on the excess power made available by the reduction in power consumed by the thermally limited processor). By dynamically reallocating the power budget of the thermally limited processor to the non-thermally limited processor, the balance controller 320 reduces the amount of the power budget that would otherwise be wasted if remained allocated to the thermally limited processor.

Figure 4:
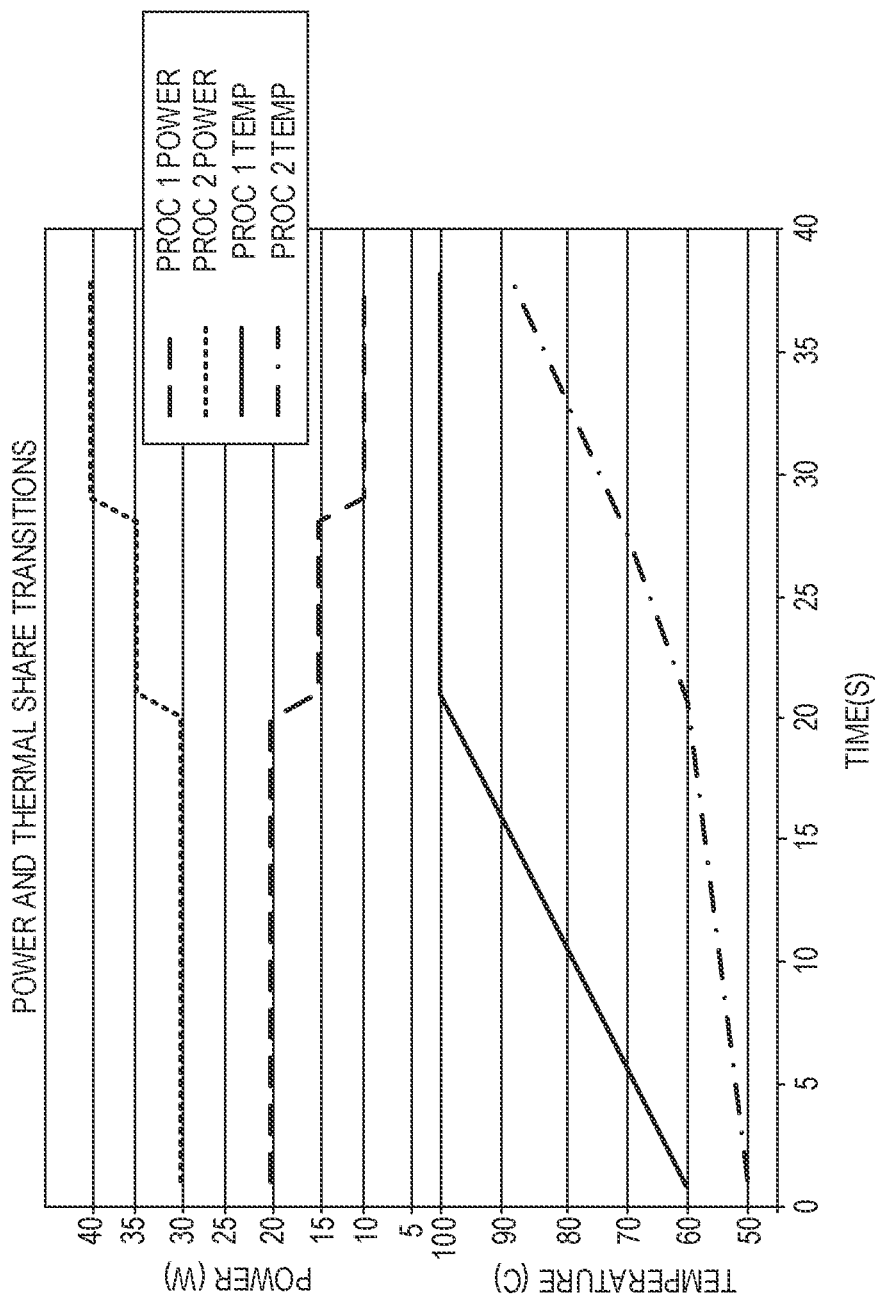
FIGS. 4-7 are graphs illustrating example implementations of different aspects of the example balancer of FIGS. 1 and/or 3.
Figure 5:
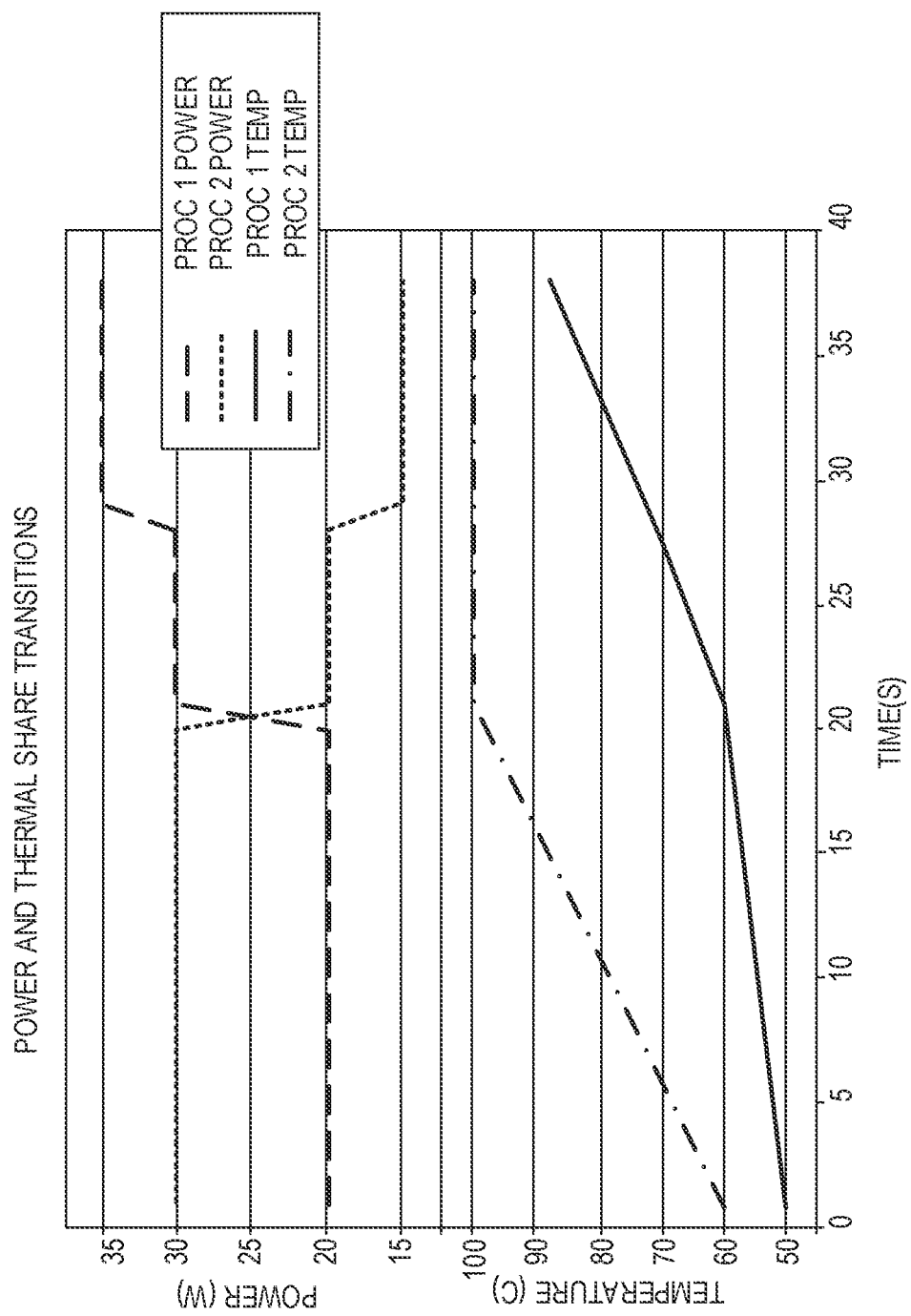

Adjusting the balance of power budget allocations between the two processors 105, 110 are demonstrated graphically in FIGS. 4 and 5, which are graphs showing the power and temperature of the two processors 105, 110 over time. In the examples of both FIGS. 4 and 5, it is assumed that there is a total power budget limited to 50 W that is to be shared between the two processors 105, 110. Further, as shown in the illustrated examples, the first processor 105 (e.g., Proc 1 in the graphs) is initially (at time t=0) allocated a power budget of 20 W and the second processor 110 (e.g., Proc 2 in the graphs) is initially allocated the remaining 30 W. In this example, the initial allocation of the power budget (at t=0) is based on the utilization metrics (e.g., activity level or workload) for the processors 105, 110 as determined by the utilization monitor 315. The temperature of the processors 105, 110 is not relevant to the power budget allocation initially because the temperature of both processors 105, 110 is well below the temperature threshold for the first processor and the second processor, which is 100° C. in this example.

As shown in the example graph of FIG. 4, the temperature of the first processor 105 (e.g., Proc 1) steadily increases until approximately t=20 seconds, at which point the first processor 105 reaches the temperature threshold temperature of 100° C. As described above, once the temperature threshold is satisfied, the first processor 105 may begin throttling to reduce power consumption. As such, the initial allocation of 20 W is no longer necessary. Accordingly, in response to detecting that the temperature of the first processor 105 satisfying the temperature threshold, with the second processor 110 operating below the temperature threshold, the example balance controller 320 increases the portion of the power budget allocated to the second processor up to 35 W (an increase of 5 W) and decreases the portion of the power budget allocated to the first processor 105 down to 15 W (a reduction of 5 W). In this example, after a polling period of approximately 8 seconds (e.g., at approximately t=28 seconds), the temperature of the first processor 105 still satisfies the temperature threshold. Accordingly, the example balance controller 320 again adjusts the allocation of the power budget by reducing the allocation to the first processor 105 by another 5 W to 10 W and increasing the allocation to the second processor 110 by another 5 W to 40 W. Inasmuch as the first processor 105 is thermally limited and, therefore, will need to reduce power consumption to avoid high temperature damage, the reduction in the allocated power to the first processor will not have a significant impact on the performance of the first processor 105. However, the increase in the power allocated to the second processor 110 (based on the unused power budget previously allocated to the first processor 105) enables the second processor 110 to increase or boost its performance, thereby achieving greater overall efficiency.

In the example of FIG. 4, the increase in the budget allocated to the second processor 110 is equal to the decrease in the budget allocated to the first processor 105. However, in other examples, the increase in power budget to one processor may be more or less than the decrease in the power budget to the other processor. Furthermore, in some examples, the incremental adjustment to the allocations of the power budget may be greater than or less than the 5 W increments shown in the illustrated example. Further, in some examples, the polling period between the separate incremental changes to the power budget balancing may be more or less than the 8 seconds shown in the illustrated example.

The example graph of FIG. 5 is similar to the graph in FIG. 4 with the same initial allocation of the power budget between the two processors 105, 110. However, unlike in FIG. 4, in the illustrated example of FIG. 5, it is the second processor 110 that steadily increases in temperature until around t=20 seconds when it reaches the thermal limit of 100° C. At this point in the illustrated example, the balance controller 320 increases the portion of the allocated power budget the first processor 110 by 10 W up to 30 W and decreases the power budget allocated to the second processor 110 by 10 W down to 20 W. The example balance controller 320 reallocates an additional 5 W from the second processor 110 to the first processor 105 approximately 8 seconds later.

As mentioned above, there are situations in which portions of an allocated power budget go unused, even when neither processor 105, 110 is thermally limited. For instance, if one of the processors 105, 110 is mostly inactive (i.e., mostly operates under the activity threshold) but shifts to a short burst of activity for a small workload before returning to inactivity, the sudden shift in activity may trigger a reallocation of more power budget to the mostly inactive processor and away from the other processor. However, the relatively short duration of activity may render the additional power budget largely unnecessary. Furthermore, there may be some delay after the processor returns to inactivity before the system again reallocates the additional power budget back to the active processor. During this delay, that additional power budget is unavailable to the active processor and not being used by the inactive processor and, therefore, is wasted. However, in some examples, the balance controller 320 applies a low pass filter to the utilization metrics provided by the utilization monitor 315 to ensure that a reallocation is triggered only when the activity of the mostly inactive processor indicates it is operating above the activity threshold for at least a threshold period of time, rather than a sporadic burst of activity.

More particularly, in some examples, the balance controller 320 uses the utilization metrics monitored by the utilization monitor 315 to detect an uninterrupted change in power demands (e.g., ongoing activity) in an otherwise inactive or idle processor (e.g., the GPU processor 110) that continues for a threshold period of time before rebalancing power between the first processor 105 and the second processor 110. In some examples, the balance controller 320 uses a threshold number of polling rates to determine if the power demands (e.g., processor activity) are uninterrupted for the threshold period of time. The threshold period of time may be of any suitable length and/or correspond to any suitable number of polling periods (e.g., 2, 3, 5, 10, etc.). If the balance controller 320 determines that the power demands are uninterrupted, the balance controller 320 reallocates the power budgets accordingly.

Figure 6:
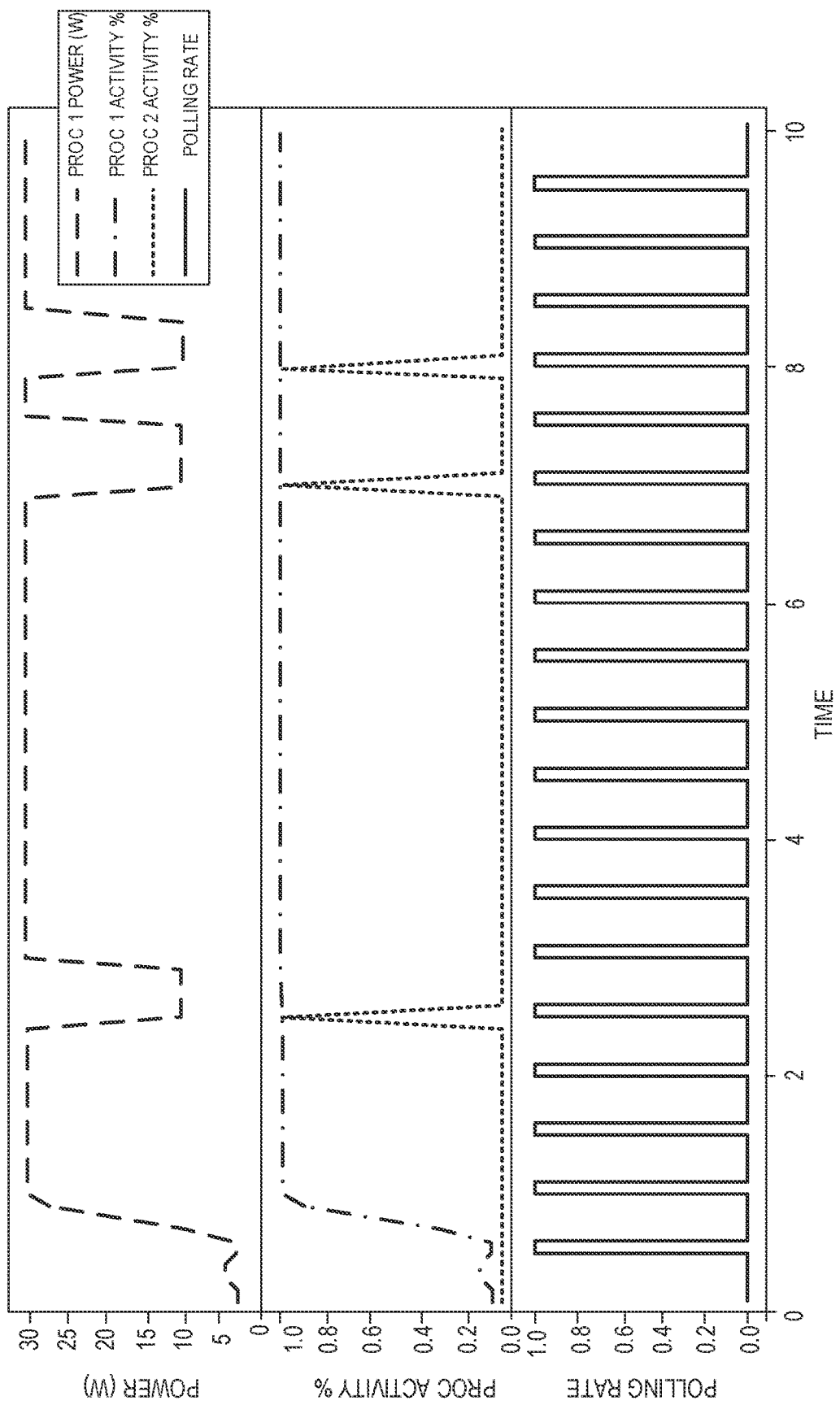
Figure 7:
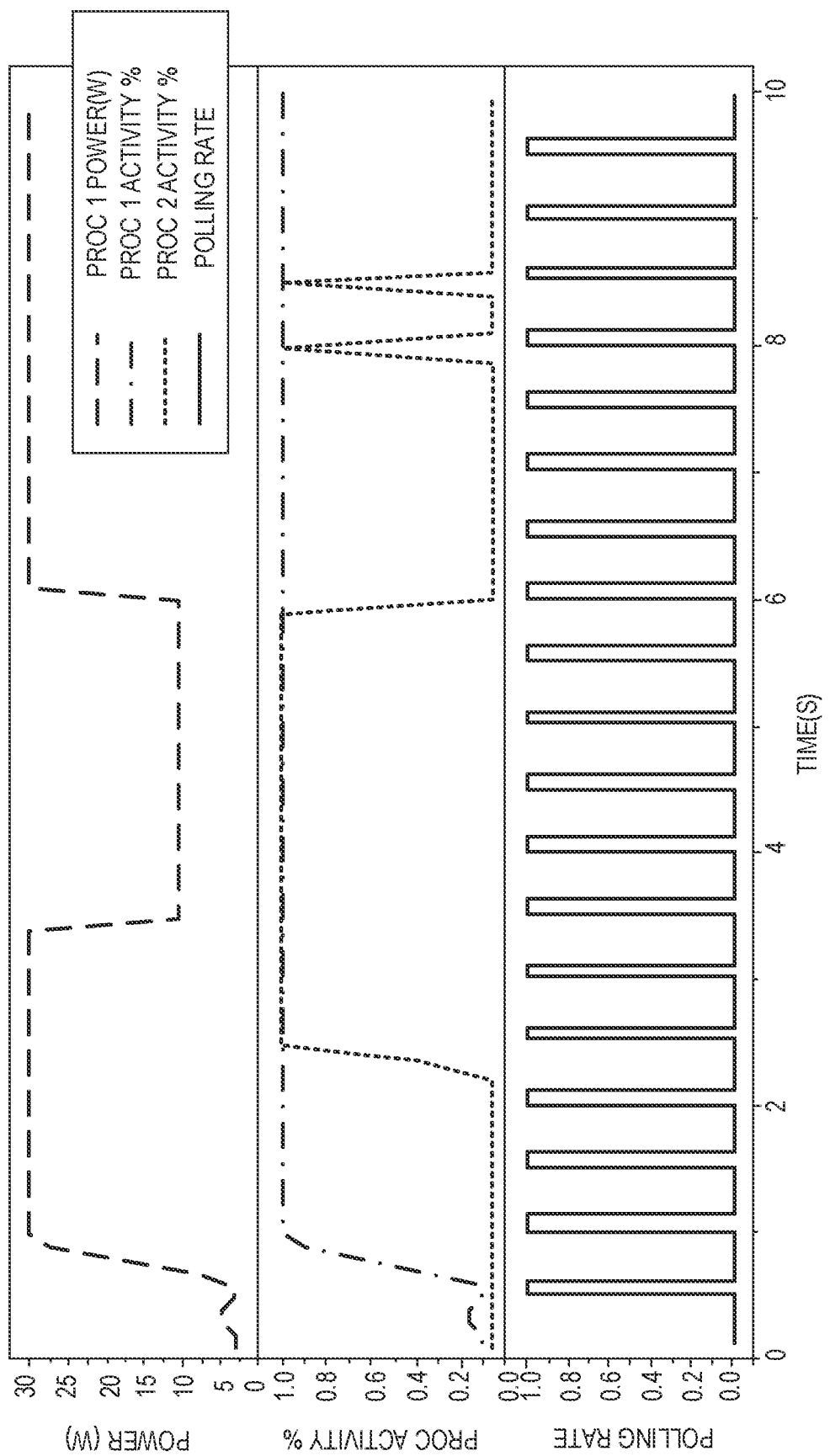

Using a filter to distinguish whether a processor is operating above the activity threshold for a threshold period of time in order to justify a rebalancing of power or the processor is engaged in a momentary burst of activity for which power rebalancing would be unproductive (and potentially deleterious to performance) are demonstrated graphically in FIGS. 6 and 7, which are graphs showing the power of the first processor 105 and the utilization (e.g., activity) of both processors 105, 110 over time. In the illustrated examples of FIGS. 6 and 7, the first processor 105 is operating between 0-5 W and quickly reaches its peak power budget of 30 W within a few polling periods. In this example, the utilization of the first processor 105 corresponds to 100% activity where it remains throughout the duration of time represented in the figures indicating the first processor 105 may be executing a significant workload (e.g., the first processor 105 is operating above the activity threshold for a threshold period of time). In the examples of FIGS. 6 and 7, the activity threshold is 80%.

FIG. 6 illustrates the unwarranted reduction of the power budget of the first processor 105 (executing a significant workload) in response to momentary spikes in the activity above the activity threshold of the second processor 110 in a system without filtering. As described above, the unnecessary power re-balancing in response to momentary peaks in utilization, which are not representative of significant workloads, of the otherwise idle processor (i.e., the GPU processor 110) results in wasted power budget. At approximately t=2.5 seconds, t=7 seconds, and t=8 seconds, momentary utilization peaks above 80% of the second processor 110 give the illusion of simultaneous peak utilization (e.g., activity above 80%) of both the first processor 105 and the second processor 110. Based on the apparent observation that the second processor 110 is now active, existing solutions would rebalance the power budget between the two processors 105, 110, thereby resulting in a decrease in the power budget allocated to the first processor as shown in the illustrated example (e.g., from 30 W to 10 W). However, the activity performed by the second processor 110 is short and temporary in nature (e.g., such as a GPU refreshing a screen) such that the significant reallocation of power budget is unnecessary and actually undermines the performance of the system because the power available to the first processor 105 (which is executing a significant workload) is reduced. In this example, there is no filter (or threshold) to determine that both processors are executing significant workloads that are more than short bursts of activity, and thus no way of knowing when there is activity indicative of a suitable time for power rebalancing. A momentary spike in utilization of the second processor 110 is not indicative of a suitable time to rebalance the power budgets.

FIG. 7 depicts an illustrated example of the filtering used by the balance controller 320 of FIG. 3 to ensure that a reallocation of power budget is triggered only when a sudden increase in activity of the second processor 110 remains active sufficiently long to satisfy a time threshold. In some examples, the time threshold corresponds to a threshold period of time and/or a threshold number of polling periods. For instance, in the illustrated example of FIG. 7, just after t=2 seconds, the second processor 110 becomes active and maintains an active state until approximately t=6 seconds. Unlike the example shown in FIG. 6 where the power budget allocated to first processor 105 is reduced immediately following the first polling period identifying the initial increase in activity of the second processor 110, there is a delay of several polling periods before the power budget is reallocated. More particularly, in response to the first processor 105 and the second processor 110 becoming active for three polling periods (i.e., the time threshold corresponds to three polling periods in this example), the balance controller 320 decreases the power budget allocated to the first processor 105 from 30 W to 10 W (and correspondingly increases the power budget allocation to the second processor 110). When the second processor 110 returns to inactivity (at approximately t=6), the balance controller 320 reallocates the power budget to allow the first processor 105 to return to its former power budget of 30 W. From t=6 to t=10, the second processor 110 has momentary bursts of activity. However, these short bursts of activity are not sustained long enough to satisfy the time threshold such that the power budget of the first processor 105 remains unchanged so that the first processor can maintain higher performance than in the example of FIG. 6.

In addition to short bursts of activity in an otherwise idle processor giving rise to unused power budget, the mere fact of one of the processors being inactive can result in unused power budget. Generally speaking, if one of the processors 105, 110 is currently inactive, then any power budget allocated to that processor will be unused. This is particularly a problem in situations where a high-power event (e.g., a turbo power event or a peak power event) has occurred. While known approaches can dynamically balance power between discrete components during and/or in response to sustained power events (e.g., events occurring during a long-term, steady-state operating mode of the system), such approaches are unable to dynamically balance power during and/or in response to high-power events (e.g., turbo power events and/or peak power events). Rather, known approaches are limited to setting fixed power limits for such high-power events that are based on trade-offs between the separate processors involved to protect input power supplies (e.g., a battery). These trade-offs are inherently limited and result in portions of the power budget going unused when one processor is inactive. As a result, such approaches exhibit less power efficiency and, by implication, less performance efficiency, than would be possible if the unused power budget was made available for other processors that are active. The example balance controller 320 dynamically allocates power budget not only during sustained power events but also during turbo power events and peak power events to improve the power and performance efficiency of the computing device 100 in response to computing tasks that benefit from short durations of high (e.g., peak) frequency.

The example methodologies to improve power and performance efficiency through improved balancing of power across discrete processors may be implemented as a software-based solution that can be executed in existing computing devices (e.g., the balancer 115 is implemented as software executed by the first processor 105 as represented in FIG. 1). For many existing devices, implementation of such software-based solutions would involve power telemetry polling and limit control occurring at a sample rate of 100 milliseconds. Faster sample rates could improve the performance and/or responsiveness of some workloads (e.g., associated with high power events) by allocating power more quickly than based on a 100 milliseconds polling rate. However, increasing the sample rate for a software-based solutions results in compute overhead that requires more power and can reduce performance. This overhead occurs because it requires a processor that might otherwise be inactive or in a low power state to remain active so as to execute the software to conduct polling for the relevant metrics and to rebalance the power budget and/or associated power limits of processors. In some examples, this overhead arising from executing a software-based solution may be avoided by implementing the balancer 115 in dedicated hardware and/or firmware. Additionally or alternatively, at least some portion of the functionality of the balancer 115 may be offloaded to firmware to reduce overhead while allowing for faster sample rates to achieve improved responsiveness and/or performance without significant impacts on the power efficiency of the system.

In some examples, for the balancer 115 to poll (or sample) at higher rates (e.g., a polling rate of 1 millisecond, 500 microseconds, etc.) as a standalone component (in dedicated hardware and/or firmware) without incurring overhead to the system, an independent communication channel (e.g., the sideband communication channel 125 of FIG. 1) is included between the balancer 115 and the processors 105, 110. This independent communication channel enables the thermal, utilization, and power metrics of the processors 105, 110 and the resulting power allocation and/or power limits to be passed between the two processors 105, 110. More particularly, in some examples, the first processor 105 includes one or more firmware controllers that read telemetry from the second processor 110 in parallel with the internal telemetry of the first processor 105. In some examples, these firmware controllers can handle the power balancing between the processors 105, 110 at samples rates as fast as 1 millisecond without the overhead that a software implementation would require. In some examples, at least some of the functionality of the balancer 115 may still reside at the software level to provide some configurability of settings by an end user as appropriate. In some such examples, the user configured parameters are provided to the lower power firmware controllers where the fast sample rate balancing is offloaded.

While an example manner of implementing the example balancer 115 of FIGS. 1 and 2 is illustrated in FIG. 3, one or more of the elements, processes and/or devices illustrated in FIG. 3 may be combined, divided, re-arranged, omitted, eliminated and/or implemented in any other way. Further, the example thermal monitor 305, the example power monitor 310, the example utilization monitor 315, and the example balance controller 320 and/or, more generally, the example balancer 115 of FIGS. 1 and 2 may be implemented by hardware, software, firmware and/or any combination of hardware, software and/or firmware. Thus, for example, any of the example thermal monitor 305, the example power monitor 310, the example utilization monitor 315, and the example balance controller 320 and/or, more generally, the example balancer 115 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example thermal monitor 305, the example power monitor 310, the example utilization monitor 315, and/or the example balance controller 320 is/are hereby expressly defined to include a non-transitory computer readable storage device or storage disk such as a memory, a digital versatile disk (DVD), a compact disk (CD), a Blu-ray disk, etc. including the software and/or firmware. Further still, the example balancer 115 of FIGS. 1 and 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example balancer 115 are shown in FIGS. 8, 9, and 10A-10C. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 8, 9, and/or 10A-10C, many other methods of implementing the example balancer 115 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8, 9, and/or 10A-10C may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
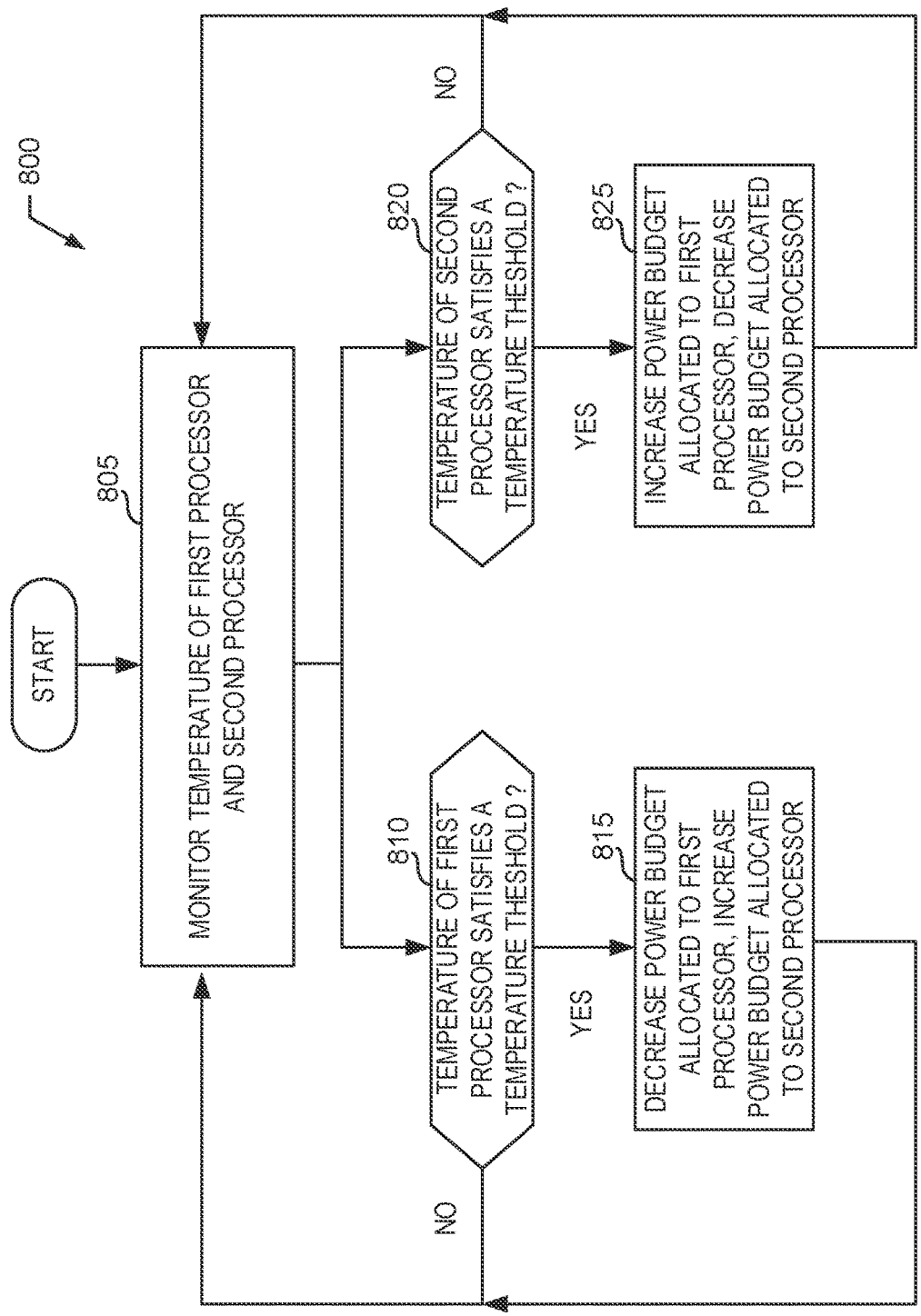
FIGS. 8, 9, and 10A-10C are flowcharts representative of example machine-readable instructions that may be executed to implement the example balancer of FIGS. 1 and/or 3.

Turning in details to the figures, FIG. 8 is a flowchart representative of example machine readable instructions 800 that, when executed cause the example balance controller 320 to increase or decrease the power budgets allocated to the example first and second processors 105, 110 in response to either of the processors becoming thermally limited. The example machine readable instructions 800 of the illustrated example of FIG. 8 begin when the example thermal monitor 305 monitors the temperature of the first processor 105 and the second processor 110. (Block 805). The temperature monitored by the thermal monitor 305 may be the skin or surface temperature of the computing device, the junction or internal temperature of the processor, and/or other temperature measures of the respective processors.

The example balance controller 320 then determines whether the temperature of the first processor 105 satisfies a temperature threshold. (Block 810). In this example, the temperature threshold is the maximum (or breakdown) temperature of the processor. However, any other suitable threshold defining a limit above which the processor is not to exceed without risking thermal damage may be used. In response to determining that the temperature of the first processor 105 does not satisfy a threshold (e.g., block 810 returns a result of NO), control returns to block 805. In response to determining that the temperature of the first processor 105 satisfies the temperature threshold (e.g., block 810 returns a result of YES), the balance controller 320 decreases the power budget allocated to the first processor 105 and increases the power budget allocated to the second processor 110. (Block 815). In some examples, the amount of change in power budget allocation between the two processors 105, 110 corresponds to a fixed increment that is stored in memory. In some examples, the amount of change in power budget allocation between the two processors 105, 110 is determined based on the temperature of the non-thermally limited processor and/or any other suitable factors (e.g., the utilization and/or activity of the non-thermally limited processor, the amount of power already allocated to each of the processors, etc.). In some examples, the power budget allocated to the first processor and the second processor are rebalanced using the instructions of FIGS. 10A-10C, where the temperatures of the first processor 105 and the second processor 110 are used to determine thermal limits of the first processor and the second processor.

In parallel with blocks 810 and 815, the example balance controller 320 determines whether the temperature of the second processor 110 satisfies a temperature threshold. (Block 820). In this example, the temperature threshold of the first processor 105 and the second processor 110 are different thresholds. However, in some examples, the temperature threshold for the first processor 105 and the second processor 110 may be the same threshold. In response to determining that the temperature of the second processor does not satisfy the temperature threshold (e.g., block 820 returns a result of NO), control returns to block 805. In response to determining that the temperature of the second processor 110 satisfies the temperature threshold (e.g., block 820 returns a result of YES), then the balance controller 320 increases the power budget allocated to the first processor 105 and decreases the power budget of the second processor. (Block 825). In some examples, the amount of change in power budget allocation between the two processors 105, 110 is determined in a similar manner to that described above in connection with block 815.

In this example, the checking of the temperature of the first processor 105 against a temperature threshold (block 810) and the checking of the temperature of the second processor 110 against a temperature threshold (block 820) occurs at the same rate and within the same polling period. In the event that the temperature of the first processor 105 and the temperature of the second processor 105 both satisfy their respective temperature thresholds, then both processors 105, 110 will initiate operations to reduce power consumption (e.g., begin throttling). As a result, both processors 105, 110 will be using less power than what is already allocated to them such that shifting the allocation of power between the two processors 105, 110 will have no appreciable impact. Accordingly, in some examples, when the temperature of both processors 105, 110 satisfy their respective temperature thresholds, blocks 815 and 825 may be skipped with control returning directly to block 805. Once the balance controller 320 determines that one of the devices is no longer thermally limited, the balance controller 320 will again begin re-allocating the power budget accordingly.

Figure 9:
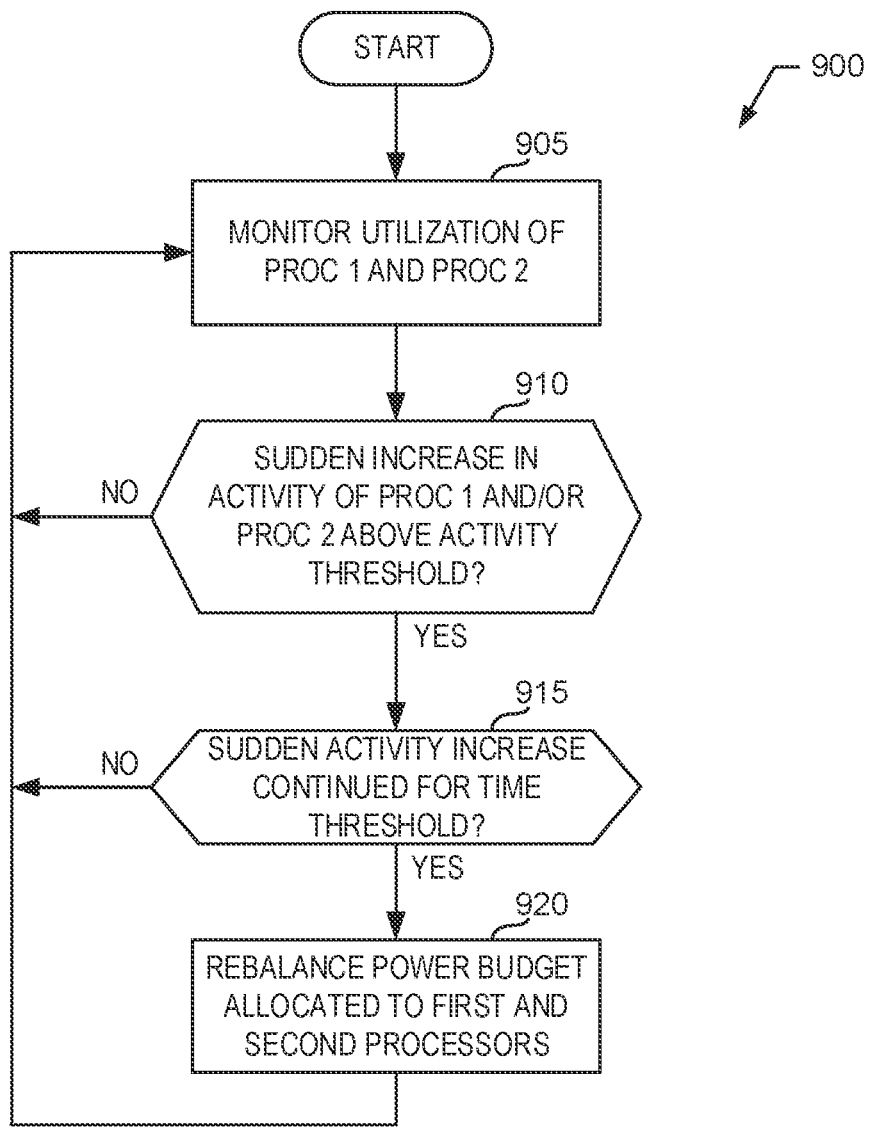

FIG. 9 is a flowchart representative of example machine readable instructions 900 that, when executed cause the example balancer controller 320 to detect an uninterrupted change in power demands (e.g., change in activity) indicative of a suitable time for power rebalancing of the first processor 105 and the second processor 110. The example machine readable instructions 900 of the illustrated example of FIG. 9 begin when the example utilization monitor 315 monitors the utilization (e.g., activity) of the first processor 105 and the second processor 110. (Block 905). The balance controller 320 then determines if there is a sudden increase in activity in at least one of the first processor 105 and the second processor 110 above the activity threshold. (Block 910). In some examples, only increases in activity that satisfy (e.g., exceed) a time threshold qualify as a detected increase in activity for purposes of the determination of block 910.

If the utilization monitor 315 determines that there has not been a sudden increase in activity in at least one of the first processor 105 and the second processor 110 (e.g., block 910 returns a result of NO), then control returns to block 905. If the utilization monitor 315 determines that there has been a sudden increase in activity in at least one of the first processor and the second processor (e.g., block 910 returns a result of YES), then the utilization monitor 315 determines if activity associated with the sudden increase continues for at least a threshold period of time. (Block 915). In some examples, the threshold period of time is defined by any suitable number of polling periods (e.g., 2, 3, 5, 8, 10, etc.). Thus, for the utilization monitor 315 to make the determination at block 915, the utilization monitor 315 continues to monitor the utilization of the first processor 105 and the second processor 106 to obtain updated metrics at each polling cycle until the threshold period of time has been reached. If the utilization monitor 315 determines that the activity associated with the sudden increase did not continue for at least a threshold period of time (e.g., block 915 returns a result of NO), then control returns to block 905 without any rebalancing of power taking place. In such situations, rebalancing power is unnecessary because the sudden increase in activity was temporary in nature (e.g., less than the threshold period of time). If the utilization monitor 315 determines that the activity associated with the sudden increase has continued for at least the threshold period of time (e.g., block 915 returns a result of YES), then the balance controller 320 rebalances the power budgets allocated to the first processor 105 and the second processor 110. (Block 920).

Figure 10A:
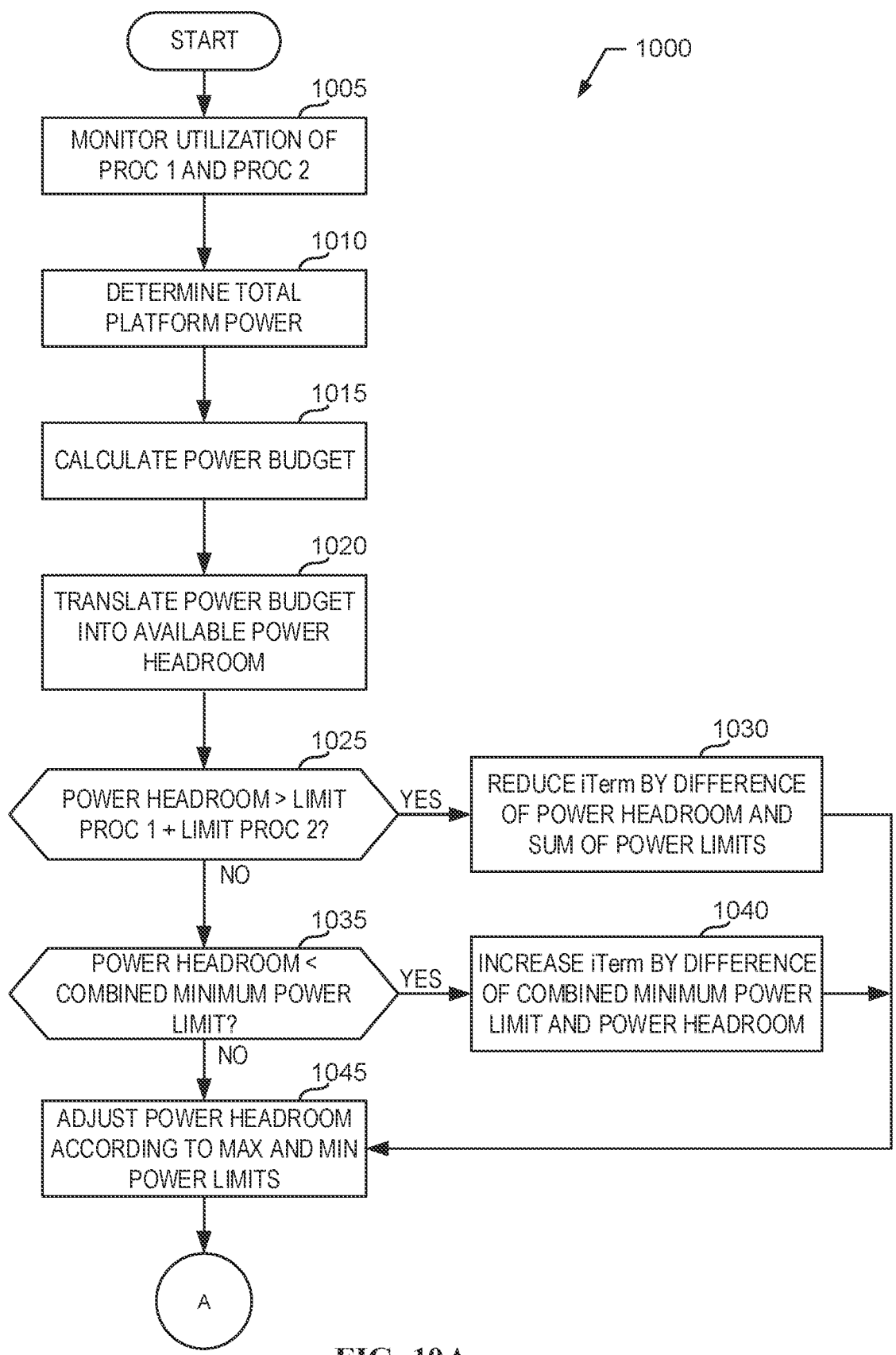
Figure 10B:
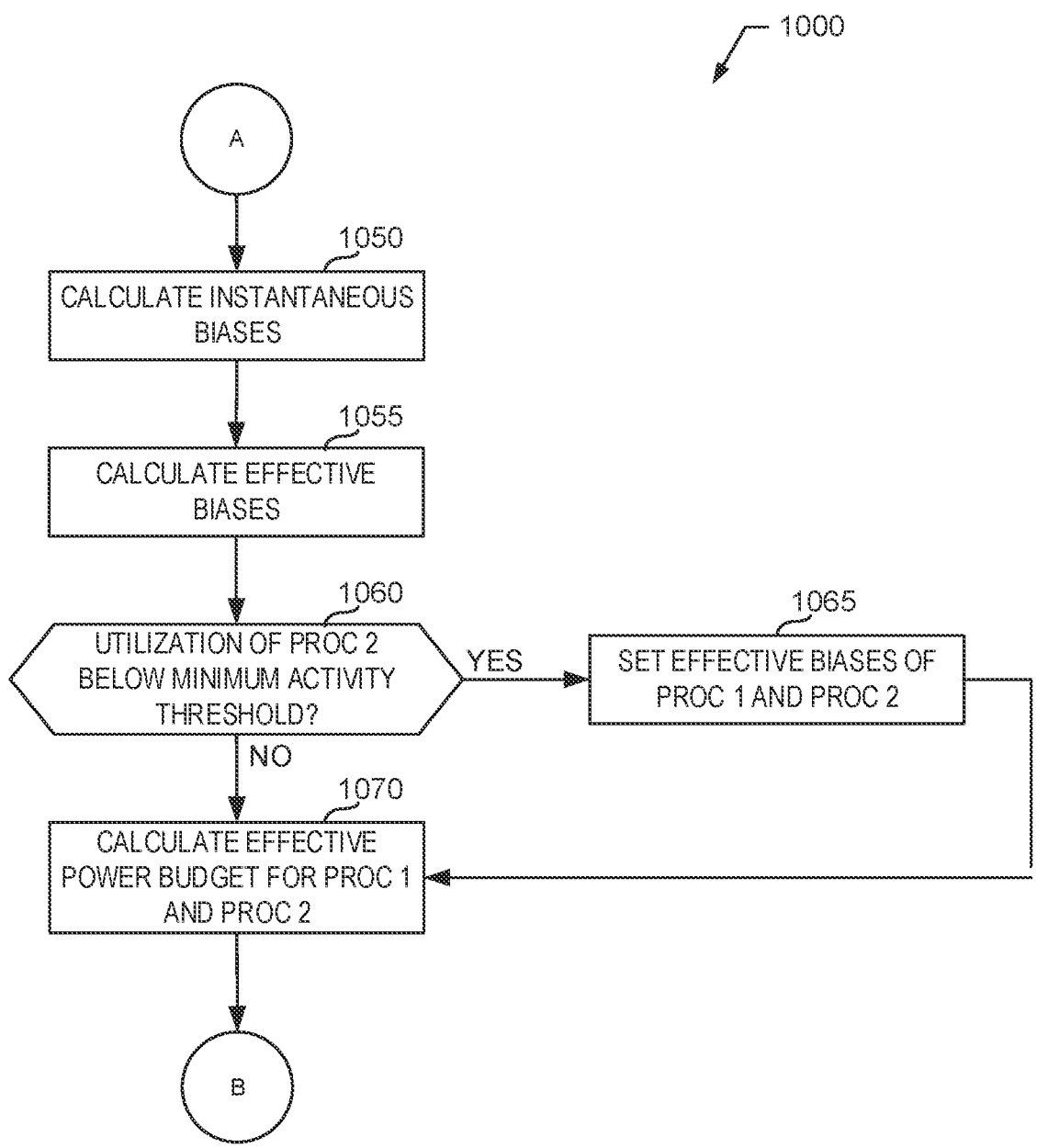
Figure 10C:
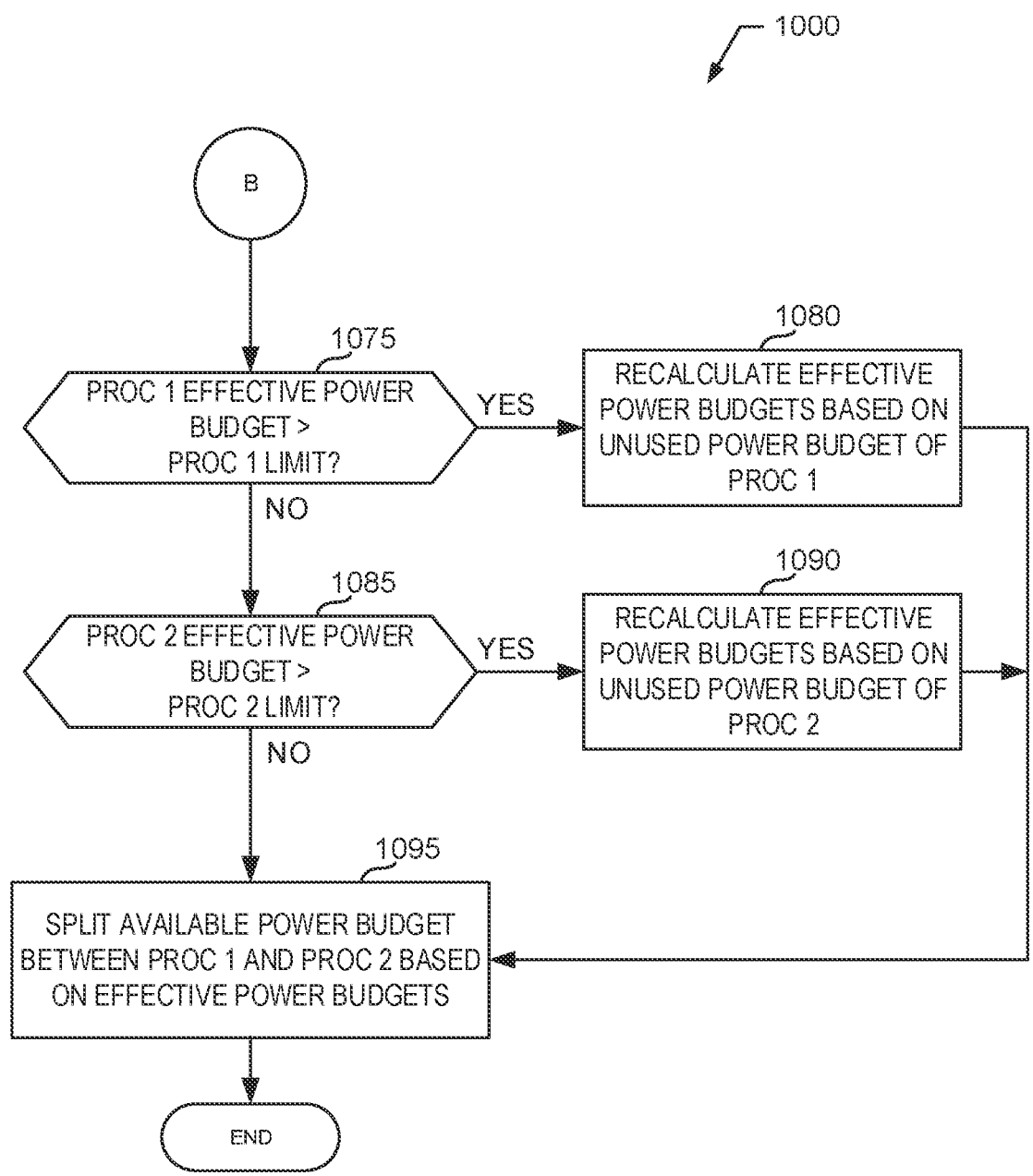

FIGS. 10A-10C are flowcharts representative of example machine readable instructions 1000 that, when executed cause the example balance controller 320 to rebalance the power budget allocated to the first processor 105 and the second processor 110 under different circumstances including high power events (e.g., turbo power events and/or peak power events). The example machine readable instructions 1000 of the illustrated example of FIGS. 10A-10C begin when the example utilization monitor 315 monitors the utilization (e.g., activity) of the first processor 105 and the second processor 110. (Block 1005). In this example, the utilization or activity information monitored by the utilization monitor 315 corresponds to an active time or residency time for each of the first and second processors 105, 110 averaged over a sample interval. For purposes of explanation, this activity information is represented in this example by the variables Delta_Proc1_Residency and Delta_Proc2_Residency, respectively. The example balance controller 320 then calculates the total platform power. (Block 1010). In this example, the total platform power is the sum of the first processor power and the second processor power averaged over a sample interval as monitored by the power monitor 310. For purposes of explanation, the total platform power is represented in this example by the variable TotalCombinePower.

In the illustrated example, the balance controller 320 then calculates the power budget of the system. (Block 1015). In this example, the balance controller 320 calculates the power budget using the following formula:

$$\text{PIDBudget}_t = \text{PIDBudget}_{t-1}*(1-\text{alpha})*(\text{PIDTarget} - \text{TotalCombinePower})$$

where PIDBudget is the accumulated budget of the system at the current (t) or previous (t−1) evaluation interval, PIDTarget is the desired limit for the balance controller 320 to maintain and alpha is calculated as 1−(SamplingPeriod)/Tau. When the PIDBudget is exhausted, the balance controller 320 moves the limit corresponding to the PIDTarget. When there is available budget, the balance controller 320 may enable operation of the processors 105, 110 above the target limit.

In the illustrated example, the balance controller 320 then translates the power budget into available power headroom for the system. (Block 1020). In some examples, the headroom corresponds to the thermal design power (TDP) for the system. In this example, the balance controller 320 calculates an iTerm value and the headroom of the system using the following formulas:

$$i\text{Term}_t = i\text{Term}_{t-1} + \text{PIDBudget}_t * \text{SamplingPeriod} * Ki$$

$$\text{PowerHeadroom} = \text{Limit} + \text{PIDBudget}_t * Kp + i\text{Term}_t$$

where iTerm serves as an intermediate parameter to translate the power budget into the available power headroom that is initialized to 0 (e.g., iTerm[0]=0), and Limit is the power limit configured to control the overall system 100 (e.g., including each of the separate processors 105, 110). In some examples, the Limit may change depending on the particular circumstances of the system 100. For instance, when a turbo power event is occurring, the Limit corresponds to the turbo power limit. Likewise, when a peak power event is occurring, the Limit corresponds to the peak power limit. In this example, the gain of the balancer 115 (Kp) and the integral constant (Ki) are constants that may be tuned according to inputs within the system 100. In this example, if PIDBudget becomes negative, PowerHeadroom will be lower than Limit, such that both the first processor and the second processor will initiate operations to reduce power consumption (e.g., begin throttling).

In the illustrated example, the balance controller 320 then determines whether the power headroom of the system is greater than the sum of a power limit for the first processor 105 and a power limit for the second processor 110. (Block 1025). In some examples, the power limits for each of the processors 105, 110 individually correspond to a corresponding maximum power limit for each particular processor. For purposes of explanation, these limits are represented by the variables MaxLimitProc1 and MaxLimitProc2. The comparison of the power headroom to the sum of the maximum power limits, enables the iTerm windup to be separated from an overall maximum limit check for a multi-processor system to enable the proper sharing of power so that the processors 105, 110 can operate at increased power that exceeds the turbo power limit and/or the peak power limit for short durations of time. More particularly, if the balance controller 320 determines that the power headroom is greater than the sum of the power limits of the first and second processors 105, 110 (e.g., block 1025 returns a result of YES), then the balance controller 320 reduces the iTerm by the difference between the power headroom and the sum of the power limits. (Block 1030). If the balance controller 320 determines that the power headroom is not greater than the sum of the power limits of the first and second processor 105, 110 (e.g., block 1025 returns a result of NO), then the balance controller 320 determines if the power headroom is less than an combined minimum power limit for the multi-processor system. (Block 1035). The combined minimum power limit may be tuned to different values depending on the desired performance characteristics of the system but generally corresponds the minimum power requirements for the systema and/or the lowest supported power for the processors 105, 110. For purposes of explanation, the combined minimum power limit is represented by the variable MinLimitCombined. If the balance controller 320 determines that the power headroom is less than the combined minimum power limit (e.g., block 1035 returns a result of YES), the balance controller 320 increases the iTerm by the difference between the combined minimum power limit and the power headroom. (Block 1040). A summary of the operations corresponding to block 1025-1040 can be expressed as follows:

If (PowerHeadroom>(MaxLimitProc1+MaxLimitProc2))

$i\text{Term}_t = i\text{Term}_{t-1} - \text{PowerHeadroom} - (\text{MaxLimitProc1} + \text{MaxLimitProc2})$ else if (PowerHeadroom<MinLimitCombine)

$i\text{Term}_t = i\text{Term}_{t-1} + \text{MinLimitCombine} - \text{PowerHeadroom}$ After calculating the new iTerm (at either block 1030 or 1040), the balance controller 320 proceeds to block 1045 where the balance controller 320 adjusts the power headroom to either the maximum or minimum power limits if not already between the maximum and minimum power limits. (Block 1045). That is, if the power headroom is between the minimum and maximum limits, the power headroom remains unchanged. However, if the power headroom is greater than the maximum power limit, the headroom is adjusted down to the maximum power limit (MaxLimitCombined). Conversely, if the power headroom is less than the minimum power limit, the headroom is adjusted up to the minimum power limit (MinLimitCombined). In this example, the balance controller 320 checks the power headroom and adjust its value as appropriate using the following formula:

PowerHeadroom=max(min(PowerHeadroom, MaxLimitCombine),MinLimitCombine)

By adjusting the power headroom in this matter, the balance controller 320 ensures that the power headroom never exceeds the maximum combined limit of the first processor and the second processor, while also ensuring that the headroom never drops below the minimum combined operating power for the first processor and the second processor.

The balance controller 320 then calculates the instantaneous bias for each of the first and second processors 105, 110. (Block 1050). In this example, the balance controller 320 calculates the instantaneous biases using the following formulas:

InstantProc1_BIAS=DefaultBiasProc1*Delta_Proc1_Residency

InstantProc2_BIAS=DefaultBiasProc2*Delta_Proc2_Residency where the default bias of the first processor 105 and the second processor 110 can be tuned according to system preferences.

The balance controller 320 then calculates the effective bias for each of the first and second processors 105, 110. (Block 1055). In this example, the balance controller 320 calculates the instantaneous biases using the following formulas:

EffectiveProc1_BIAS=0.5+(InstantProc1_BIAS−InstantProc2_BIAS)/2

EffectiveProc2_BIAS=0.5+(InstantProc2_BIAS−InstantProc1_BIAS)/2

The balance controller 320 then determines if the utilization of the second processor 110 (e.g., the activity monitored at block 1005) is below a minimum activity threshold. (Block 1060). In some examples, the minimum activity threshold is set relatively low (e.g., 0% activity time 1% activity time, 3% activity time, 5% activity time, 10% activity time, etc.) to identify situations when there is relatively little, if any, activity in the second processor 110. In this example, the determination of the utilization is limited to the second processor 110 based on the assumption that the first processor 105 is a main processor (e.g., a CPU) that is usually active with some workload to execute whereas the second processor 110 is a graphics processor (e.g., a GPU) that is provided workloads intermittently and so has frequent periods of inactivity. In other examples, the balance controller 320 may analyze the utilization of the first processor 105 in addition to or instead of the second processor 110. If the balance controller 320 determines that the utilization of the second processor 110 is below the minimum activity threshold (e.g., block 1060 returns a result of YES), the balance controller 320 sets the effective biases of the first and second processors 105, 110 to fixed values. (Block 1065). In this example, the fixed value for the effective bias for the first processor 105 is 0.95 and the fixed value for the effective bias for the second processor 110 is 0.05. However, in other examples, the fixed values may be higher or lower. After the effective biases have been set, the balance controller 320 proceeds to block 1070. If the balance controller 320 determines that the utilization of the second processor is not below a threshold (e.g., block 1060 returns a result of NO), the balance controller 320 proceeds directly to block 1070 without adjusting the effective biases. In this example, the balance controller 320 determines if the utilization of the second processor is below a threshold as sets the effective biases appropriately using the following formulas:

If (Delta_Proc2_Residency<=5%)

EffectiveProc1_BIAS=0.95

EffectiveProc2_BIAS=0.05

At block 1070, the balance controller 320 calculates an effective power budget for each of the first and second processors 105, 110 are calculated. In this example, the balance controller 320 calculates the effective power budgets using the following formulas:

effectiveProc1PowerBudget=PowerHeadroom*EffectiveProc1_BIAS effectiveProc2PowerBudget=PowerHeadroom*EffectiveProc2_BIAS The effective power budgets calculated at block 1070 provide a baseline for the allocation of power between the two processors 105, 110. However, as described above, there are circumstances where a processor may be using less than all the power budget the processor is allocated (e.g., because the processor is not active, self-throttling, etc.). Accordingly, in the illustrated example, the balance controller 320 determines if any rebalancing of power budget allocations should be made based on unused power budget. More particular, in some examples, the balance controller 320 determines if the effective power budget calculated for the first processor 105 is greater than the maximum power limit of the first processor. (Block 1075). If the balance controller 320 determines that the effective power budget calculated for the first processor 105 is greater than the maximum power limit of the first processor (e.g., block 1075 returns a result of YES), the balance controller 320 adjusts effective power budgets for the first and second processors 105, 110 based on the power budget unused by the first processor 105. (Block 1080). The balance controller 320 then proceeds to block 1095. If the balance controller 320 determines that the effective power budget calculated for the first processor 105 is not greater than the maximum power limit of the first processor (e.g., block 1075 returns a result of NO), the balance controller 320 proceeds to block 1085 without adjusting the effective power budgets of the processors. The balance controller 320 then determines if the effective power budget calculated for the second processor 110 is greater than the maximum power limit of the second processor. (Block 1085). If the balance controller 320 determines that the effective power budget calculated for the second processor 110 is greater than the maximum power limit of the second processor (e.g., block 1085 returns a result of YES), the balance controller 320 adjusts the effective power budgets for the first and second processors 105, 110 based on the power budget unused by the second processor 110. (Block 1090). The balance controller 320 than proceeds to block 1095. If the balance controller 320 determines that the effective power budget of the second processor is not greater than the maximum power limit of the second processor (e.g., block 1085 returns a result of NO), the balance controller 320 proceeds to block 1095 without adjusting the effective power budgets of the processors. In this example, the balance controller 320 performs the functions of block 1075-1090 using the following operations:

if (effectiveProc1PowerBudget>MaxLimitProc1)

remainingProc1PowerBudget=effectiveProc1PowerBudget−MaxLimitProc1 effectiveProc2PowerBudget=effectiveProc2PowerBudget+remainingProc1PowerBudget else if (effectiveProc2PowerBudget>MaxLimitProc2)

remainingProc2PowerBudget=effectiveProc2PowerBudget−MaxLimitProc2 effectiveProc1PowerBudget=effectiveProc1PowerBudget+remainingProc2PowerBudget

The balance controller 320 then splits the available power budget between the first processor 105 and the second processor 110 based on the effective power budgets determined for the processors. (Block 1095). In this example, the balance controller 320 splits the power budget using the following operations:

Proc1PowerBudget=min(max(effectiveProc1PowerBudget,MinLimitProc1),MaxLimitProc1)

Proc2PowerBudget=min(max(effectiveProc2PowerBudget,MinLimitProc2),MaxLimitProc2)

In some examples, any of the example instructions 800 of FIG. 8, the example instructions 900 of FIG. 9, and/or the example instructions 1000 of FIGS. 10A-10C can be implemented independent of the others. Further, in some examples, any of the example instructions 800 of FIG. 8, the example instructions 900 of FIG. 9, and/or the example instructions 1000 of FIGS. 10A-10C can be implemented in conjunction with and/or in parallel with one another.

Figure 11:
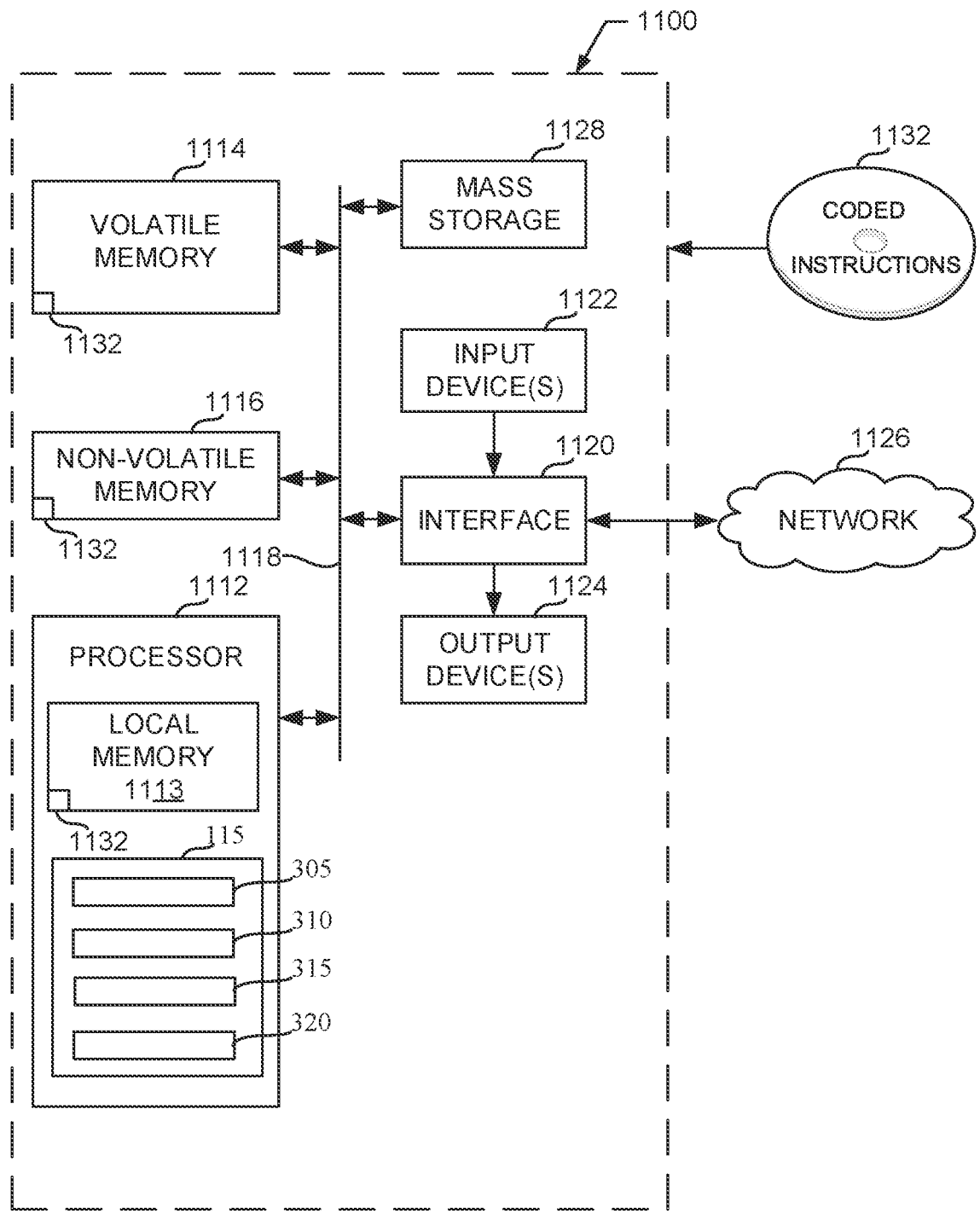
FIG. 11 is a block diagram of an example processing platform structured to execute the example instructions of FIGS. 8, 9, and/or 10A-10C to implement the example balancer of FIGS. 1 and/or 3.

FIG. 11 is a block diagram of an example processor platform 1100 structured to execute the instructions of FIGS. 8, 9, and 10A-10C to implement the balancer 115 of FIGS. 1, 2, and 3. The processor platform 1100 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example thermal monitor 305, the example power monitor 310, the example utilization monitor 315, and the example balance controller 320.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 8, 9, and 10A-10C may be stored in the mass storage device 1128, in the volatile memory 1114, in the non-volatile memory 1116, and/or on a removable non-transitory computer readable storage medium such as a CD or DVD.

Figure 12:
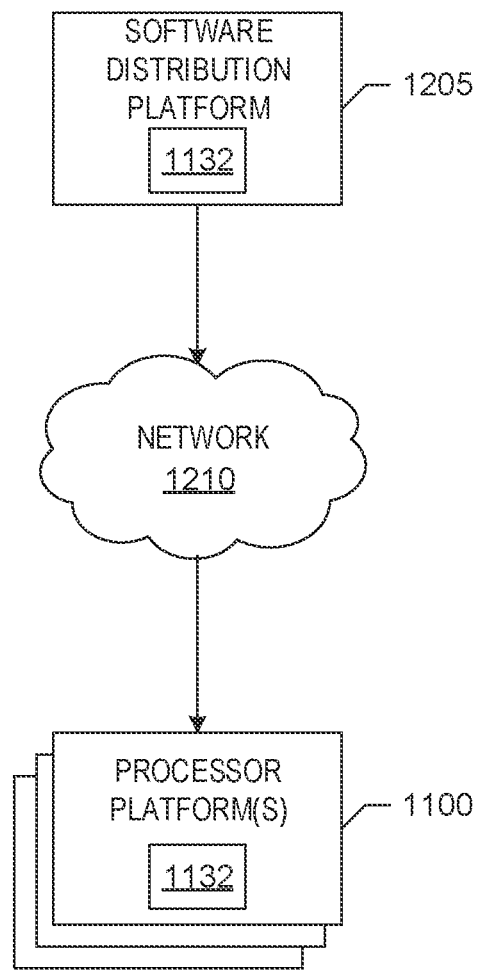
FIG. 12 is a block diagram of an example software distribution platform to distribute software (e.g., software corresponding to the example machine-readable instructions of FIGS. 8, 9, and/or 10A-10C) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1205 to distribute software such as the example computer readable instructions 1132 of FIG. 11 to third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1132 of FIG. 11. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the computer readable instructions 1132, which may correspond to the example computer readable instructions 800, 900, or 1000 of FIGS. 8, 9, and 10A-10C as described above. The one or more servers of the example software distribution platform 1205 are in communication with a network 1210, which may correspond to any one or more of the Internet and/or the example network 1126 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1132 from the software distribution platform 1205. For example, the software, which may correspond to the example computer readable instructions 800, 900, and/or 1000 of FIGS. 8, 9, and/or 10A-10C, may be downloaded to the example processor platform 1100, which is to execute the computer readable instructions 1132 to implement the balancer 115. In some example, one or more servers of the software distribution platform 1205 periodically offer, transmit, and/or force updates to the software (e.g., the example computer readable instructions 1132 of FIG. 11) to ensure improvements, patches, updates, etc. are distributed and applied to the software at the end user devices.

From the foregoing, it will be appreciated that example methods, apparatus and articles of manufacture have been disclosed that allow for balancing power shared between discrete processors in manner that that reduces power overhead of the control loop for improved power and/or performance efficiencies. The disclosed methods, apparatus and articles of manufacture improve the efficiency of using a computing device with multiple discrete processors by allowing for thermally aware power rebalancing when one of the processors within the device is thermally limited. Additionally, examples disclosed herein enable power delivery relevant power limits and instantaneous short duration power limits to be balanced appropriately. The examples disclosed herein also implement a filtering technique that prevents false balancer transitions and misallocations of power budgets due to short bursts of activity in a processor that is otherwise largely inactive. The disclosed methods, apparatus and articles of manufacture are accordingly directed to one or more improvement(s) in the functioning of a computer.

Example methods, apparatus, systems, and articles of manufacture for power sharing between discrete processors are disclosed herein. Further examples and combinations thereof include the following:

Example 1 includes an apparatus comprising a thermal monitor to monitor temperatures of first and second discrete processors, and a balance controller to, in response to a first temperature of the first processor satisfying a temperature threshold, adjust first and second power budgets allocated to the respective first and second processors.

Example 2 includes the apparatus of example 1, wherein the balance controller is to, in response to a second temperature of the second processor satisfying a second threshold, adjust the first and second power budgets.

Example 3 includes the apparatus of example 1, further including a utilization monitor to monitor activity of the first and second processors, and a power monitor to monitor power consumption of the first and second processors, the balance controller to adjust the first and second power budgets based on the temperatures of the first and second processors, the activity of the first and second processors, and the power consumption of the first and second processors.

Example 4 includes the apparatus of example 1, further including a first communication channel between the first processor and the second processor, and a second communication channel between the first processor and the second processor, the second communication channel distinct from the first communication channel, the second communication channel dedicated to transmitting information used by the balance controller to determine adjustments to the first and second power budgets.

Example 5 includes the apparatus of example 1, wherein the balance controller is to adjust the first and second power budgets by decreasing the first power budget allocated to the first processor and increasing the second power budget allocated to the second processor.

Example 6 includes the apparatus of example 5, wherein the first power budget allocated to the first processor is to decrease a same amount as the second power budget allocated to the second processor is to increase.

Example 7 includes the apparatus of example 6, wherein the amount of decrease and increase of the respective first and second power budgets is based on utilization metrics associated with the first and second processors.

Example 8 includes the apparatus of example 1, further including a utilization monitor to monitor activity of the first and second processors, the balance controller to determine a power headroom for the first and second processors, determine first and second effective power budgets for the respective first and second processors based on the power headroom and the activity of the first and second processors, determine an unused portion of at least one of the first effective power budget or the second effective power budget, adjust the first and second effective power budgets based on the unused portion of the at least one of the first effective power budget or the second effective power budget, and define the first and second power budgets allocated to the respective first and second processors based on the adjusted first and second effective power budgets.

Example 9 includes the apparatus of example 8, wherein the power headroom is based on a current power limit designated for the first and second processors, the current power limit corresponding to at least one of a turbo power limit or a peak power limit.

Example 10 includes the apparatus of example 1, further including a utilization monitor to detect an increase in activity of the second processor at a first point in time, the balance controller to, in response to the increased activity continuing for a threshold period, adjust the first and second power budgets.

Example 11 includes the apparatus of example 10, wherein the utilization monitor is to detect a decrease in the activity of the second processor at a second point in time after the first point in time, and the balance controller is to not adjust the first and second power budgets if the second point in time occurs before an end of the threshold period.

Example 12 includes the apparatus of example 1, wherein the balance controller is implemented by the first processor.

Example 13 includes the apparatus of example 1, wherein at least a portion of the balance controller is implemented by hardware external to both the first processor and the second processor.

Example 14 includes the apparatus of example 1, wherein the first and second processors are included in a single IC package.

Example 15 includes an apparatus comprising at least one memory, a first processor, and a second processor discrete from the first processor, the first processor to execute instructions to monitor temperatures of the first and second discrete processors, and in response to a first temperature of the first processor satisfying a temperature threshold, adjust first and second power budgets allocated to the respective first and second processors.

Example 16 includes the apparatus of example 15, wherein the first processor is to, in response to a second temperature of the second processor satisfying a second threshold, adjust the first and second power budgets.

Example 17 includes the apparatus of example 15, wherein the first processor is to monitor activity of the first and second processors, monitor power consumption of the first and second processors, and adjust the first and second power budgets based on the temperatures of the first and second processors, the activity of the first and second processors, and the power consumption of the first and second processors.

Example 18 includes the apparatus of example 15, further including a first communication channel between the first processor and the second processor, and a second communication channel between the first processor and the second processor, the second communication channel distinct from the first communication channel, the second communication channel dedicated to transmitting information used by the first processor to determine adjustments to the first and second power budgets.

Example 19 includes the apparatus of example 15, wherein the first processor is to adjust the first and second power budgets by decreasing the first power budget allocated to the first processor and increasing the second power budget allocated to the second processor.

Example 20 includes the apparatus of example 19, wherein the first power budget allocated to the first processor is to decrease a same amount as the second power budget allocated to the second processor is to increase.

Example 21 includes the apparatus of example 20, wherein the amount of decrease and increase of the respective first and second power budgets is based on utilization metrics associated with the first and second processors.

Example 22 includes the apparatus of example 15, wherein the first processor is to monitor activity of the first and second processors, determine a power headroom for the first and second processors, determine first and second effective power budgets for the respective first and second processors based on the power headroom and the activity of the first and second processors, determine an unused portion of at least one of the first effective power budget or the second effective power budget, adjust the first and second effective power budgets based on the unused portion of the at least one of the first effective power budget or the second effective power budget, and define the first and second power budgets allocated to the respective first and second processors based on the adjusted first and second effective power budgets.

Example 23 includes the apparatus of example 22, wherein the power headroom is based on a current power limit designated for the first and second processors, the current power limit corresponding to at least one of a turbo power limit or a peak power limit.

Example 24 includes the apparatus of example 15, wherein the first processor is to detect an increase in activity of the second processor at a first point in time, and in response to the increased activity continuing for a threshold period, adjust the first and second power budgets.

Example 25 includes the apparatus of example 24, wherein the instructions executed by first processor cause the first processor to detect a decrease in the activity of the second processor at a second point in time after the first point in time, and not adjust the first and second power budgets if the second point in time occurs before an end of the threshold period.

Example 26 includes At least one non-transitory computer readable medium comprising instructions that, when executed, cause a machine to at least monitor temperatures of first and second discrete processors, and in response to a first temperature of the first processor satisfying a temperature threshold, adjust first and second power budgets allocated to the respective first and second processors.

Example 27 includes the at least one non-transitory computer readable medium of example 26, wherein the instructions cause the machine to, in response to a second temperature of the second processor satisfying a second threshold, adjust the first and second power budgets.

Example 28 includes the at least one non-transitory computer readable medium of example 26, wherein the instructions cause the machine to monitor activity of the first and second processors, monitor power consumption of the first and second processors, and adjust the first and second power budgets based on the temperatures of the first and second processors, the activity of the first and second processors, and the power consumption of the first and second processors.

Example 29 includes the at least one non-transitory computer readable medium of example 26, wherein the instructions cause the machine to communicate first data via a first communication channel between the first processor and the second processor, the first communication channel distinct from a second communication channel between the first processor and the second processor, the first communication channel dedicated to transmitting information used by the machine to determine adjustments to the first and second power budgets.

Example 30 includes the at least one non-transitory computer readable medium of example 26, wherein the instructions cause the machine to adjust the first and second power budgets by decreasing the first power budget allocated to the first processor and increasing the second power budget allocated to the second processor.

Example 31 includes the at least one non-transitory computer readable medium of example 30, wherein the first power budget allocated to the first processor is to decrease a same amount as the second power budget allocated to the second processor is to increase.

Example 32 includes the at least one non-transitory computer readable medium of example 31, wherein the amount of decrease and increase of the respective first and second power budgets is based on utilization metrics associated with the first and second processors.

Example 33 includes the at least one non-transitory computer readable medium of example 26, wherein the instructions cause the machine to monitor activity of the first and second processors, determine a power headroom for the first and second processors, determine first and second effective power budgets for the respective first and second processors based on the power headroom and the activity of the first and second processors, determine an unused portion of at least one of the first effective power budget or the second effective power budget, adjust the first and second effective power budgets based on the unused portion of the at least one of the first effective power budget or the second effective power budget, and define the first and second power budgets allocated to the respective first and second processors based on the adjusted first and second effective power budgets.

Example 34 includes the at least one non-transitory computer readable medium of example 33, wherein the power headroom is based on a current power limit designated for the first and second processors, the current power limit corresponding to at least one of a turbo power limit or a peak power limit.

Example 35 includes the at least one non-transitory computer readable medium of example 26, wherein the instructions cause the machine to detect an increase in activity of the second processor at a first point in time, and in response to the increased activity continuing for a threshold period, adjust the first and second power budgets.

Example 36 includes the at least one non-transitory computer readable medium of example 35, wherein the instructions cause the machine to detect a decrease in the activity of the second processor at a second point in time after the first point in time, and not adjust the first and second power budgets if the second point in time occurs before an end of the threshold period.

Example 37 includes a method comprising monitoring temperatures of first and second discrete processors, and in response to a first temperature of the first processor satisfying a temperature threshold, adjust first and second power budgets allocated to the respective first and second processors.

Example 38 includes the method of example 37, further including adjusting, in response to a second temperature of the second processor satisfying a second threshold, the first and second power budgets.

Example 39 includes the method of example 37, further including monitoring activity of the first and second processors, monitoring power consumption of the first and second processors, and adjusting the first and second power budgets based on the temperatures of the first and second processors, the activity of the first and second processors, and the power consumption of the first and second processors.

Example 40 includes the method of example 37, further including communicating first data via a first communication channel between the first processor and the second processor, and communicating second data via a second communication channel between the first processor and the second processor, the second communication channel distinct from the first communication channel, the second communication channel dedicated to transmitting information used by the first processor to determine adjustments to the first and second power budgets.

Example 41 includes the method of example 37, wherein the adjusting of the first and second power budgets includes decreasing the first power budget allocated to the first processor and increasing the second power budget allocated to the second processor.

Example 42 includes the method of example 41, wherein the first power budget allocated to the first processor is to decrease a same amount as the second power budget allocated to the second processor is to increase.

Example 43 includes the method of example 42, wherein the amount of decrease and increase of the respective first and second power budgets is based on utilization metrics associated with the first and second processors.

Example 44 includes the method of example 37, further including monitoring activity of the first and second processors, determining a power headroom for the first and second processors, determining first and second effective power budgets for the respective first and second processors based on the power headroom and the activity of the first and second processors, determining an unused portion of at least one of the first effective power budget or the second effective power budget, adjusting the first and second effective power budgets based on the unused portion of the at least one of the first effective power budget or the second effective power budget, and defining the first and second power budgets allocated to the respective first and second processors based on the adjusted first and second effective power budgets.

Example 45 includes the method of example 44, wherein the power headroom is based on a current power limit designated for the first and second processors, the current power limit corresponding to at least one of a turbo power limit or a peak power limit.

Example 46 includes the method of example 37, further including detecting an increase in activity of the second processor at a first point in time, and in response to the increased activity continuing for a threshold period, adjusting the first and second power budgets.

Example 47 includes the method of example 46, further including detecting a decrease in the activity of the second processor at a second point in time after the first point in time, and not adjusting the first and second power budgets if the second point in time occurs before an end of the threshold period.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    interface circuitry, and
    processor circuitry to:
        obtain a first temperature of a first processor implemented in a first semiconductor die, the first temperature associated with the first processor consuming a first amount of power of a first power budget of the first processor, the first processor different than a second processor implemented in a second semiconductor die, the second semiconductor die distinct from the first semiconductor die, the second processor consuming a second amount of power of a second power budget of the second processor; and
        in response to the first temperature of the first processor satisfying a temperature threshold, decrease the first power budget of the first processor by a first portion that reduces the first amount of power being consumed by the first processor and reduces the first temperature to be below the temperature threshold, the second processor consuming a third amount of power using all of the second power budget and at least a portion of the first portion of the first power budget, the second processor exhibiting improved performance while consuming the third amount of power relative to consuming the second amount of power.

2. The apparatus of claim 1, wherein subsequent first and second power budgets are based on a second temperature of the second processor satisfying a second threshold.

3. The apparatus of claim 1, wherein subsequent first and second power budgets are based on the first temperature of the first processor and a second temperature of the second processor, activity of the first and second processors, and the power consumption of the first and second processors.

4. The apparatus of claim 1, further including:
a first communication channel between the first processor and the second processor; and
a second communication channel between the first processor and the second processor, the second communication channel distinct from the first communication channel, the second communication channel dedicated to transmitting information used by the processor circuitry, and subsequent first and second power budgets being based on the transmitted information.

5. The apparatus of claim 1, wherein the first portion is based on utilization metrics associated with the first and second processors.

6. The apparatus of claim 1, wherein:
initial first and second effective power budgets for the respective first and second processors are based on a power headroom for at least one of the first and second processors and activity of the first and second processors;
subsequent first and second effective power budgets are based on an unused portion of the at least one of the initial first effective power budget or the initial second effective power budget; and
the first and second power budgets allocated to the respective first and second processors are based on the subsequent first and second effective power budgets.

7. The apparatus of claim 6, wherein the power headroom is based on a current power limit designated for the at least one of the first and second processors, the current power limit corresponding to at least one of a turbo power limit or a peak power limit.

8. The apparatus of claim 1, wherein subsequent first and second power budgets are based on increased activity of the second processor at a first point in time continuing for a threshold period.

9. The apparatus of claim 8, wherein the first and second power budgets remain unchanged if a second point in time after the first point in time occurs before an end of the threshold period, and a decrease in the activity of the second processor occurs at the second point in time.

10. The apparatus of claim 1, wherein the processor circuitry is implemented by the first processor.

11. The apparatus of claim 1, wherein at least a portion of the processor circuitry is implemented by hardware external to both the first processor and the second processor.

12. The apparatus of claim 1, wherein the first and second processors are included in a single integrated circuit (IC) package.

13. An apparatus comprising:
at least one memory;
machine readable instructions;
a first semiconductor die including a first processor; and
a second semiconductor die including a second processor different than the first processor, the second semiconductor die separate from the first semiconductor die, the first processor to execute the instructions to:
obtain temperatures of the first and second processors, a first temperature associated with the first processor consuming a first amount of power of a first power budget of the first processor, the second processor consuming a second amount of power of a second power budget of the second processor; and
in response to a first temperature of the first processor satisfying a temperature threshold, decrease the first power budget of the first processor by a first portion that reduces the first amount of power being consumed by the first processor and reduces the first temperature to be below the temperature threshold, the second processor consuming a third amount of power using all of the second power budget and at least a portion of the first portion of the first power budget, the second processor exhibiting improved performance while consuming the third amount of power relative to consuming the second amount of power.

14. The apparatus of claim 13, wherein subsequent first and second power budgets are based on a second temperature of the second processor satisfying a second threshold.

15. The apparatus of claim 13, wherein subsequent first and second power budgets are based on the first temperature of the first processor and a second temperature of the second processor, activity of the first and second processors, and the power consumption of the first and second processors.

16. The apparatus of claim 13, further including:
a first communication channel between the first processor and the second processor; and
a second communication channel between the first processor and the second processor, the second communication channel distinct from the first communication channel, the second communication channel dedicated to transmitting information used by the first processor, and subsequent first and second power budgets being based on the transmitted information.

17. The apparatus of claim 13, wherein:
initial first and second effective power budgets for the respective first and second processors are based on a power headroom for at least one of the first and second processors and activity of the first and second processors;
subsequent first and second effective power budgets are based on an unused portion of the at least one of the initial first effective power budget or the initial second effective power budget; and
the first and second power budgets allocated to the respective first and second processors are based on the subsequent first and second effective power budgets.

18. The apparatus of claim 13, wherein subsequent first and second power budgets are based on increased activity of the second processor at a first point in time continuing for a threshold period.

19. The apparatus of claim 18, wherein the first and second power budgets remain unchanged if a second point in time after the first point in time occurs before an end of the threshold period, and a decrease in the activity of the second processor occurs at the second point in time.

20. At least one non-transitory computer readable medium comprising instructions to cause a machine to at least:

obtain a first temperature of a first processor implemented in a first semiconductor die, the first processor different than a second processor implemented in a second semiconductor die, the second semiconductor die distinct from the first semiconductor die, the first temperature associated with the first processor consuming a first amount of power of a first power budget of the first processor, the second processor consuming a second amount of power of a second power budget of the second processor; and in response to the first temperature of the first processor satisfying a temperature threshold, decrease the first power budget of the first processor by a first portion that reduces the first amount of power being consumed by the first processor and reduces the first temperature to be below the temperature threshold, the second processor consuming a third amount of power using all of the second power budget and at least a portion of the first portion of the first power budget, the second processor exhibiting improved performance while consuming the third amount of power relative to consuming the second amount of power.

21. The at least one non-transitory computer readable medium of claim 20, wherein subsequent first and second power budgets are based on the first temperature of the first processor and a second temperature of the second processor, activity of the first and second processors, and the power consumption of the first and second processors.

22. The at least one non-transitory computer readable medium of claim 20, wherein the instructions cause the machine to:

communicate first data via a first communication channel between the first processor and the second processor, the first communication channel distinct from a second communication channel between the first processor and the second processor, the first communication channel dedicated to transmitting information used by the machine, and subsequent first and second power budgets being based on the transmitted information.

23. The at least one non-transitory computer readable medium of claim 20, wherein:

initial first and second effective power budgets for the respective first and second processors are based on a power headroom for at least one of the first and second processors and activity of the first and second processors;

subsequent first and second effective power budgets are based on an unused portion of the at least one of the initial first effective power budget or the initial second effective power budget; and the first and second power budgets allocated to the respective first and second processors are based on the subsequent first and second effective power budgets.

24. The at least one non-transitory computer readable medium of claim 20, wherein subsequent first and second power budgets are based on increased activity of the second processor at a first point in time continuing for a threshold period.

25. The at least one non-transitory computer readable medium of claim 24, wherein the first and second power budgets remain unchanged if a second point in time after the first point in time occurs before an end of the threshold period, and a decrease in the activity of the second processor occurs at the second point in time.

* * * * *